(12) United States Patent
Hatakeyama et al.

(10) Patent No.: US 8,659,672 B2
(45) Date of Patent: Feb. 25, 2014

(54) IMAGE PROCESSING APPARATUS AND IMAGE PICKUP APPARATUS USING SAME

(75) Inventors: Koshi Hatakeyama, Toyko (JP); Nobuhiko Tamura, Toyko (JP); Tsunefumi Tanaka, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 396 days.

(21) Appl. No.: 12/967,389

(22) Filed: Dec. 14, 2010

(65) Prior Publication Data

US 2011/0149103 A1    Jun. 23, 2011

(30) Foreign Application Priority Data

Dec. 17, 2009    (WO) .................. PCT/JP2009/071066

(51) Int. Cl.
*H04N 5/235*    (2006.01)
*H04N 5/228*    (2006.01)

(52) U.S. Cl.
USPC ...................................... 348/222.1

(58) Field of Classification Search
None
See application file for complete search history.

(56) References Cited

U.S. PATENT DOCUMENTS

| | | | |
|---|---|---|---|
| 5,602,412 A * | 2/1997 | Suzuki et al. | 348/223.1 |
| 6,984,206 B2 | 1/2006 | Kumei et al. | |
| 7,683,950 B2 * | 3/2010 | Kelly et al. | 348/252 |
| 2003/0122926 A1 | 7/2003 | Kumei et al. | |
| 2003/0184663 A1 * | 10/2003 | Nakano et al. | 348/241 |
| 2005/0168614 A1 * | 8/2005 | Okada et al. | 348/335 |
| 2007/0103744 A1 * | 5/2007 | Chiba | 358/518 |
| 2008/0080019 A1 * | 4/2008 | Hayashi et al. | 358/474 |
| 2009/0195672 A1 | 8/2009 | Ono | |
| 2010/0074519 A1 * | 3/2010 | Utsugi | 382/167 |
| 2010/0214438 A1 | 8/2010 | Hayashi et al. | |

FOREIGN PATENT DOCUMENTS

| | | |
|---|---|---|
| JP | 2003199708 A | 7/2003 |
| JP | 2007-181170 A | 7/2007 |
| JP | 2007-183842 A | 7/2007 |
| JP | 2009213129 A | 9/2009 |

* cited by examiner

*Primary Examiner* — Sinh Tran
*Assistant Examiner* — Jason Flohre
(74) *Attorney, Agent, or Firm* — Canon USA Inc IP Division

(57) ABSTRACT

To provide an image processing apparatus capable of obtaining a good-quality image even if an unexpected aberration occurs and an image pickup apparatus using the same. An image processing apparatus includes a primary restored image generating module configured to generate a primary restored image by performing image restoration processing on an input image having a plurality of color components, a restoration component generating module configured to generate difference information for each of the plurality of color components by calculating a difference between the input image and the primary restored image, and a secondary restored image generating module configured to generate a secondary restored image using the difference information. The secondary restored image generating module combines a color-combination restoration component based on the difference information for the plurality of color components with one color component of the input image.

15 Claims, 20 Drawing Sheets

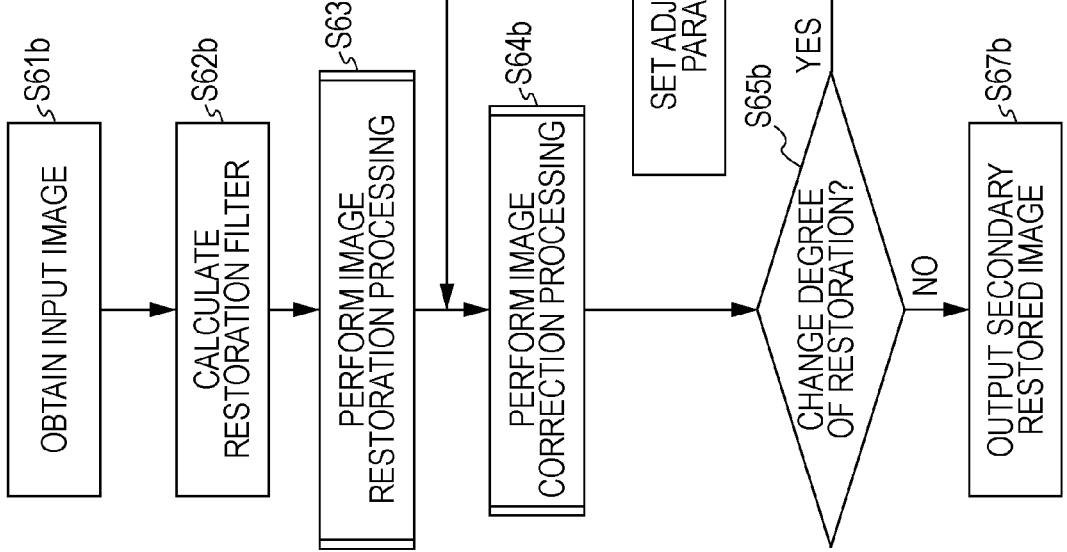
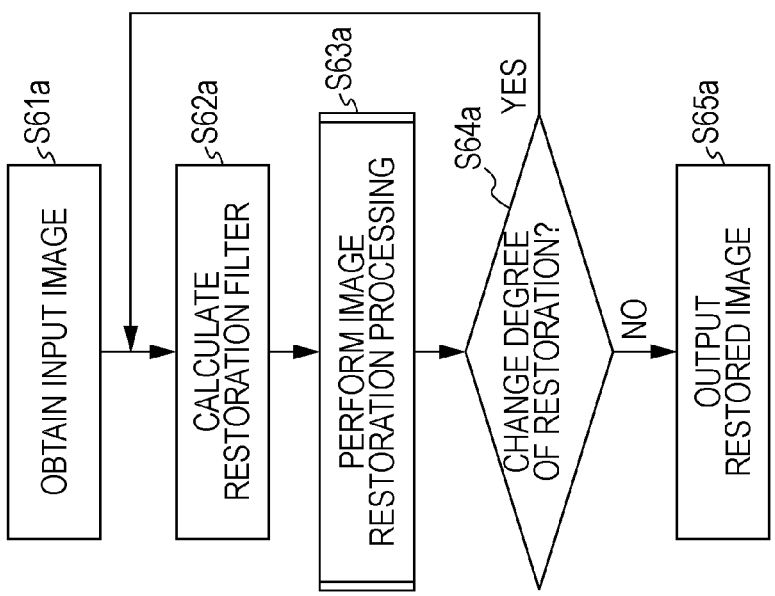

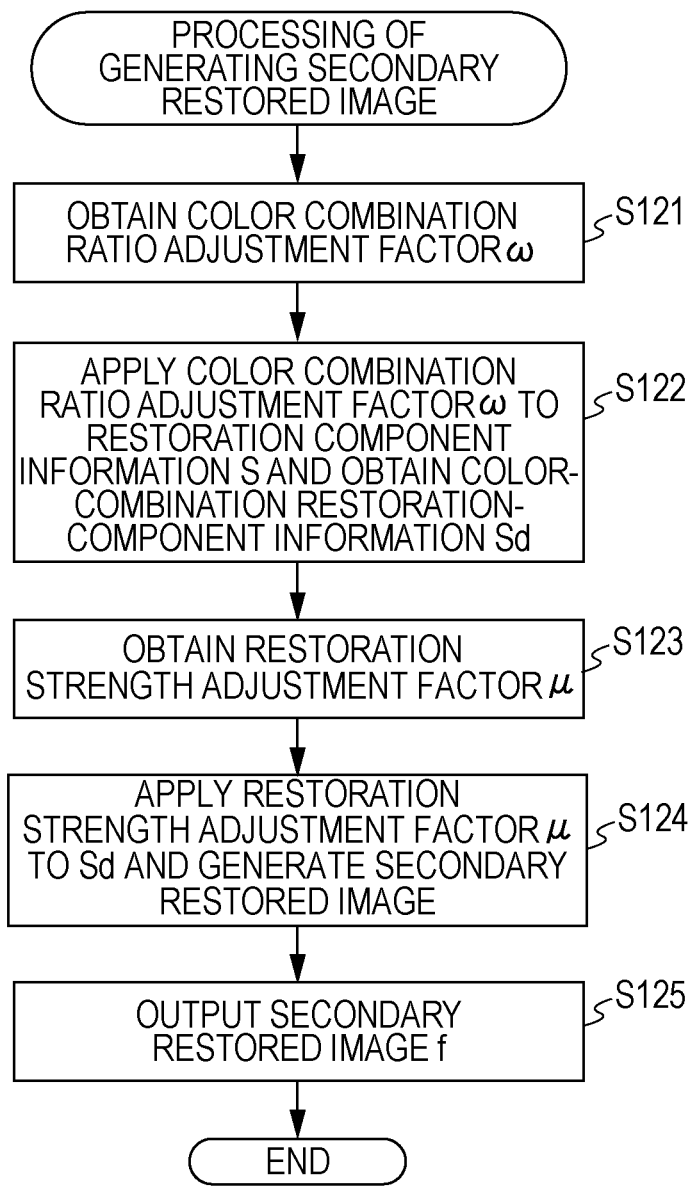

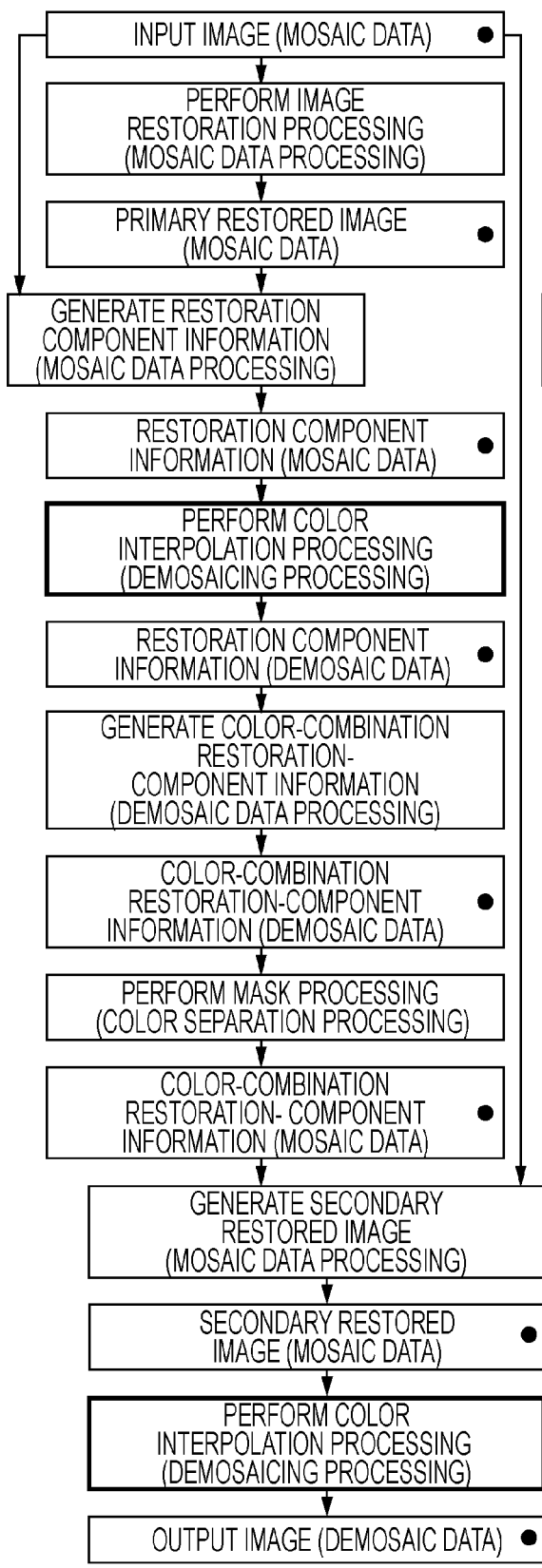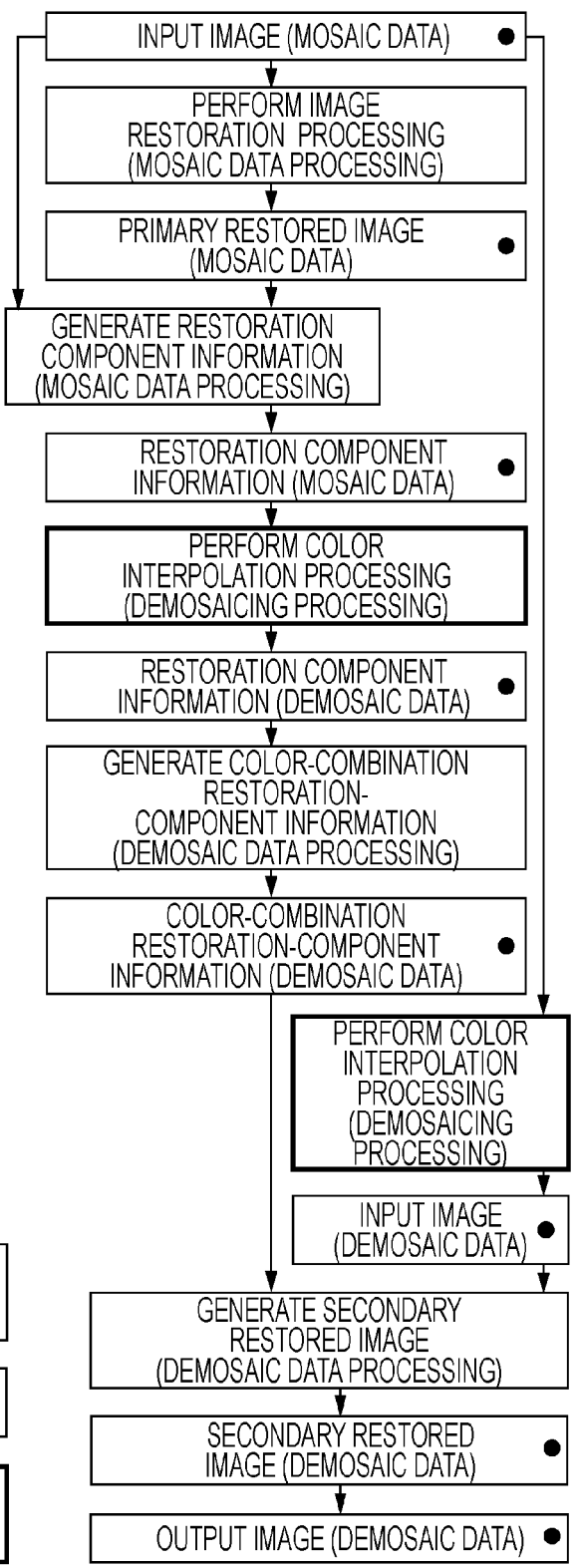

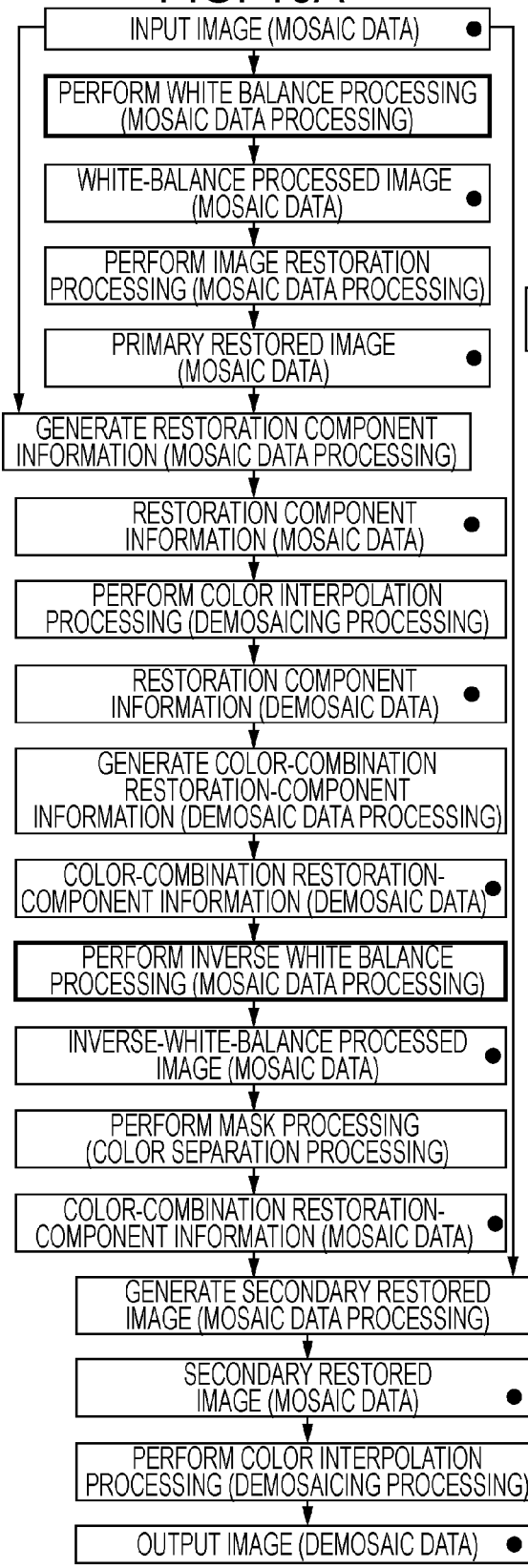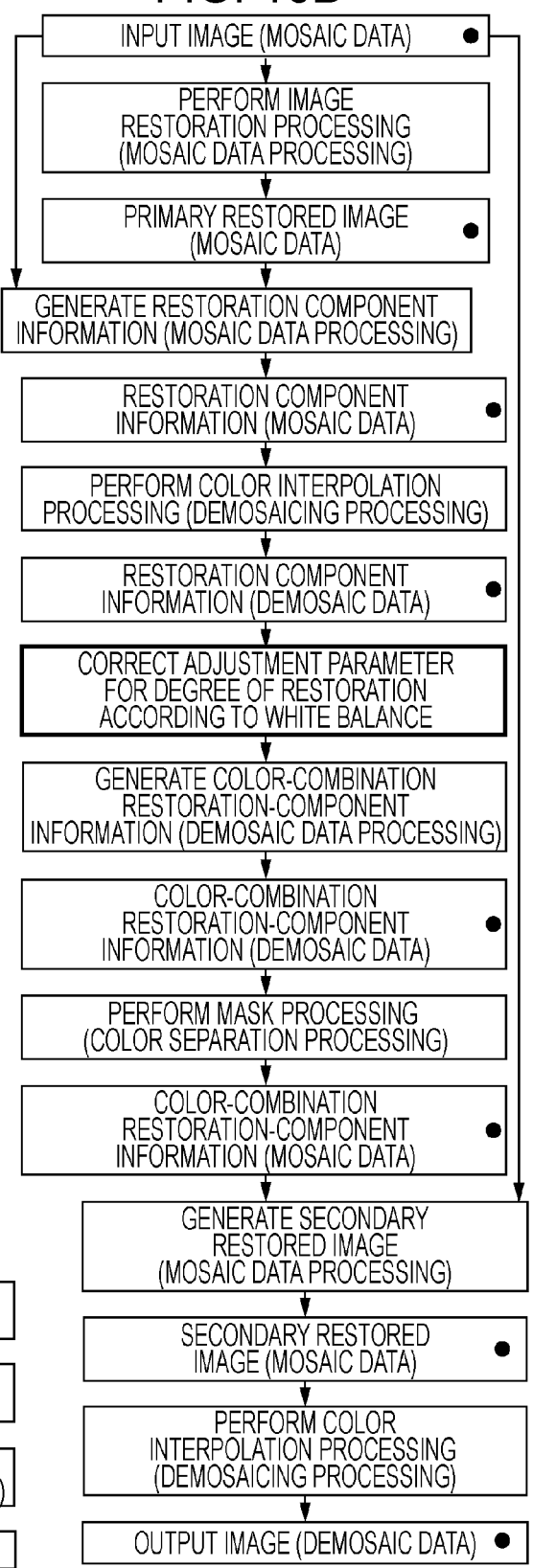

IMAGE PROCESSING APPARATUS AND IMAGE PICKUP APPARATUS USING SAME

TECHNICAL FIELD

The present invention relates to a method of performing image processing on a captured image and, in particular, to correction of degraded image using image restoration processing.

BACKGROUND ART

As digitization of information proceeds, techniques for obtaining desired images by digital signal processing on input images have been proposed. In capturing an image of an object using an image pickup apparatus, considerable degradation is caused to an obtained image by aberration occurring in an image pickup optical system. One known technique for correcting degradation in image is correction using information on an optical transfer function (hereinafter referred to as OTF) of an image pickup optical system.

Japanese Patent Laid-Open No. 2007-183842 discloses an image restoration filter as which an optical transfer function (OTF) obtained by Fourier transform of a point spread function describing degradation in image caused by an image pickup optical system is used. The image restoration filter is capable of continuously adjusting the degree of image restoration of a captured image by allowing its parameter to be adjusted.

However, even when image restoration is performed using an image restoration filter in Japanese Patent Laid-Open No. 2007-183842, if aberration for each color component caused by an image pickup optical system differs from expected aberration characteristics, unexpected chromatic blurring occurs in the captured image and its image quality degrades.

Such chromatic blurring can be caused by variations in image pickup optical systems resulting from manufacturing errors, spectral changes under image capturing environment, image capture of a three-dimensional object, or luminance saturation. Image pickup of a three-dimensional object is described below as one example of a situation where chromatic blurring occurs. An image pickup apparatus focuses on one plane in an object space by the autofocus function or manual focusing to capture an image. When the object is a three-dimensional object, its object distance varies with an angle of view. In this case, if the object is in focus, its image is relatively sharply captured, whereas if the object is out of focus, blurring according to its distance occurs in its image. When traditional image restoration processing is preformed on a captured image having such a blur, if the object is in focus, desired sharpness is obtainable for its edges because the image restoration filter is optimal. However, if the object is out of focus, chromatic blurring may occur in the edges or chromatic blurring may be large unnaturally. The occurrence of such chromatic blurring in image restoration processing for improving the image quality of an output image significantly degrades the image quality.

Accordingly, it is an object of the present invention to provide an image processing apparatus capable of reducing the occurrence of unnatural chromatic blurring that can occur in traditional image restoration processing and capable of obtaining good image quality.

SUMMARY OF INVENTION

To solve the above problems, the present invention provides an image processing apparatus including a primary restored image generating module configured to generate a primary restored image by performing image restoration processing on an input image having a plurality of color components, a restoration component module configured to generate difference information for each of the plurality of color components by calculating a difference between the input image and the primary restored image, and a secondary restored image generating module configured to generate a secondary restored image using the difference information. The secondary restored image generating module combines a color-combination component based on the difference information for the plurality of color components with one color component of the input image.

Further features of the present invention will become apparent from the following description of exemplary embodiments with reference to the attached drawings.

BRIEF DESCRIPTION OF DRAWINGS

FIGS. 6A and 6B illustrate process flows in comparison with a traditional example.

FIG. 12 illustrates a process flow occurring when the color combination ratio adjustment factor $\omega$ and the restoration strength adjustment factor $\mu$ are used.

FIGS. 15A and 15B illustrate process flows in the case where color interpolation processing is performed.

FIGS. 16A and 16B illustrate process flows in the case where white balance correction processing is performed.

DESCRIPTION OF EMBODIMENTS

Embodiments for carrying out the present invention are described below using the drawings. In the specification, the term "image blurring" is used. The image blurring indicates a spread (distribution) of beams, on an image plane, that should be focused (converged) on a single point, and typically, it can be also called a point spread function (PSF). This blurring results from spherical aberration, comma aberration, curvature of field, astigmatism, or other aberration in an optical system. As for image blurring, an image being out of focus can also be said to have a blur, for example. Here, in particular, it indicates one in which a blur occurs because of effects of aberration in an optical system even if the image is in focus.

First Embodiment

With a first embodiment, an example is described in which, as image processing occurring when chromatic blurring caused by unexpected aberration is present in an image captured by an image pickup apparatus, changing the color combination ratio of color components with respect to a certain color using a parameter that is a color combination ratio adjustment factor enables the image to have good quality.

Figure 1:
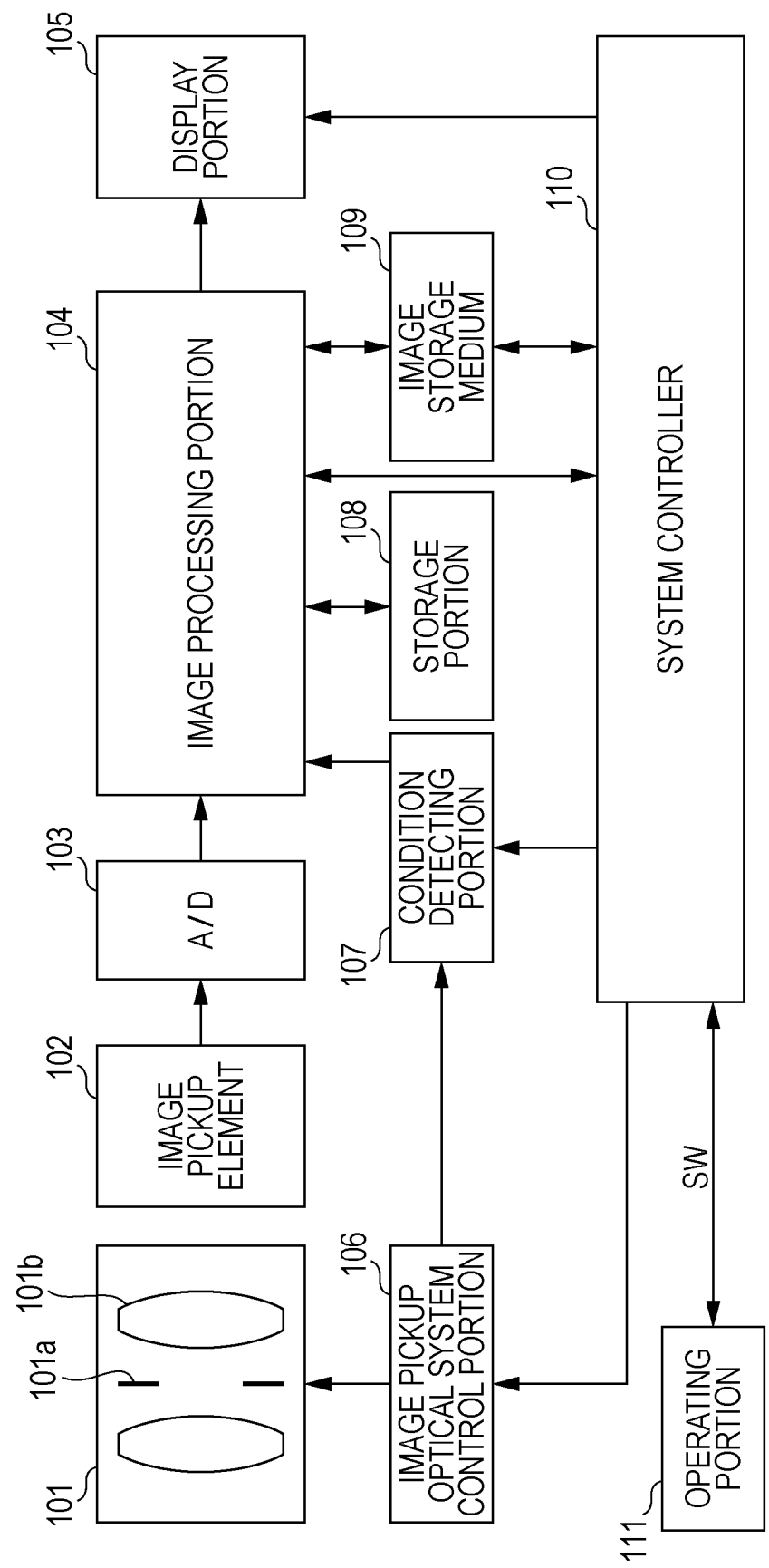
FIG. 1 is a block diagram of an image pickup apparatus according to a first embodiment.

FIG. 1 is a block diagram of an image pickup apparatus according to the first embodiment. The arrows in the drawing indicate main paths over which information is transmitted. Reference numeral 101a indicates a stop, and reference numeral 101b indicates a focus lens. An image pickup optical system 101 includes the stop 101a and the focus lens 101b. Reference numeral 102 indicates an image pickup element that converts an optical image into an electrical signal and that includes a charge-coupled device (CCD) or a complementary metal-oxide semiconductor (CMOS) sensor. Reference numeral 103 indicates an analog-to-digital (A/D) converter that converts analog signal image data output from the image pickup element 102 into digital signal image data. Reference numeral 104 indicates an image processing portion that performs image processing (signal processing), such as processing of correcting chromatic blurring in an image and processing of reducing blurring. Reference numeral 105 indicates a display portion, for instance, a liquid-crystal display or an organic electroluminescent display. The display portion 105 displays image data processed in the image processing portion 104 or image data stored in a storage portion 108 or an image storage medium 109. Reference numeral 106 indicates an image pickup optical system control portion that controls the stop 101a and the focus lens 101b of the image pickup optical system 101. Examples of the image pickup optical system control portion 106 include an autofocus mechanism or a manual focus mechanism for adjusting focusing in accordance with an object distance. Reference numeral 107 indicates a condition detecting portion that detects a photographing condition (e.g., the diameter of the stop, zoom position, object distance). Reference numeral 110 indicates a system controller that exercises control over the system of the image pickup apparatus. The system controller 110 controls image processing for the image processing portion 104 and, in addition to this, stores image data written in the storage portion 108 into the image storage medium 109 as a file form. Reference numeral 111 indicates an operating portion that inputs instructions of various operations into the system controller 110. Examples of the operating portion include a release button for providing an instruction to pick up an image, a directional button for operating a cursor or a menu, and a touch panel.

The image pickup optical system 101 is configured as part of the image pickup apparatus. However, it may be interchangeable and can be one in a single-lens reflex camera, for example. Here, for the sake of simplification, only the stop 101a and the focus lens 101b, which are main constituents of the image pickup optical system 101, are illustrated. However, the image pickup optical system 101 may also use a mirror (reflection surface) having a curvature, in addition to the lens. The image processing portion 104 includes at least an arithmetic section and a temporary storage section (buffer) and writes an image into and reads an image from the temporary storage section on an as needed basis for each processing described below. For example, in the case of processing of generating a secondary restored image, which is described below, in order to combine difference information for each color component between an input image and a primary restored image, an initially obtained input image can be temporarily stored in the temporary storage section (buffer). A storage section for use in temporary storage is not limited to the temporary storage section (buffer), and it may be the storage portion 108, for example. Any suited element can be selected, depending on the data capacity of the storage portion having the storing function and the transmission speed. The image processing portion 104 or the storage portion 108 having the temporary storage section stores data necessary to perform image processing. Examples of such necessary data include a luminance value of a pixel of an image, information on aberration of the image pickup optical system 101, an image restoration filter described below, difference information, a color combination ratio adjustment factor, and a restoration strength adjustment factor.

Figure 2:
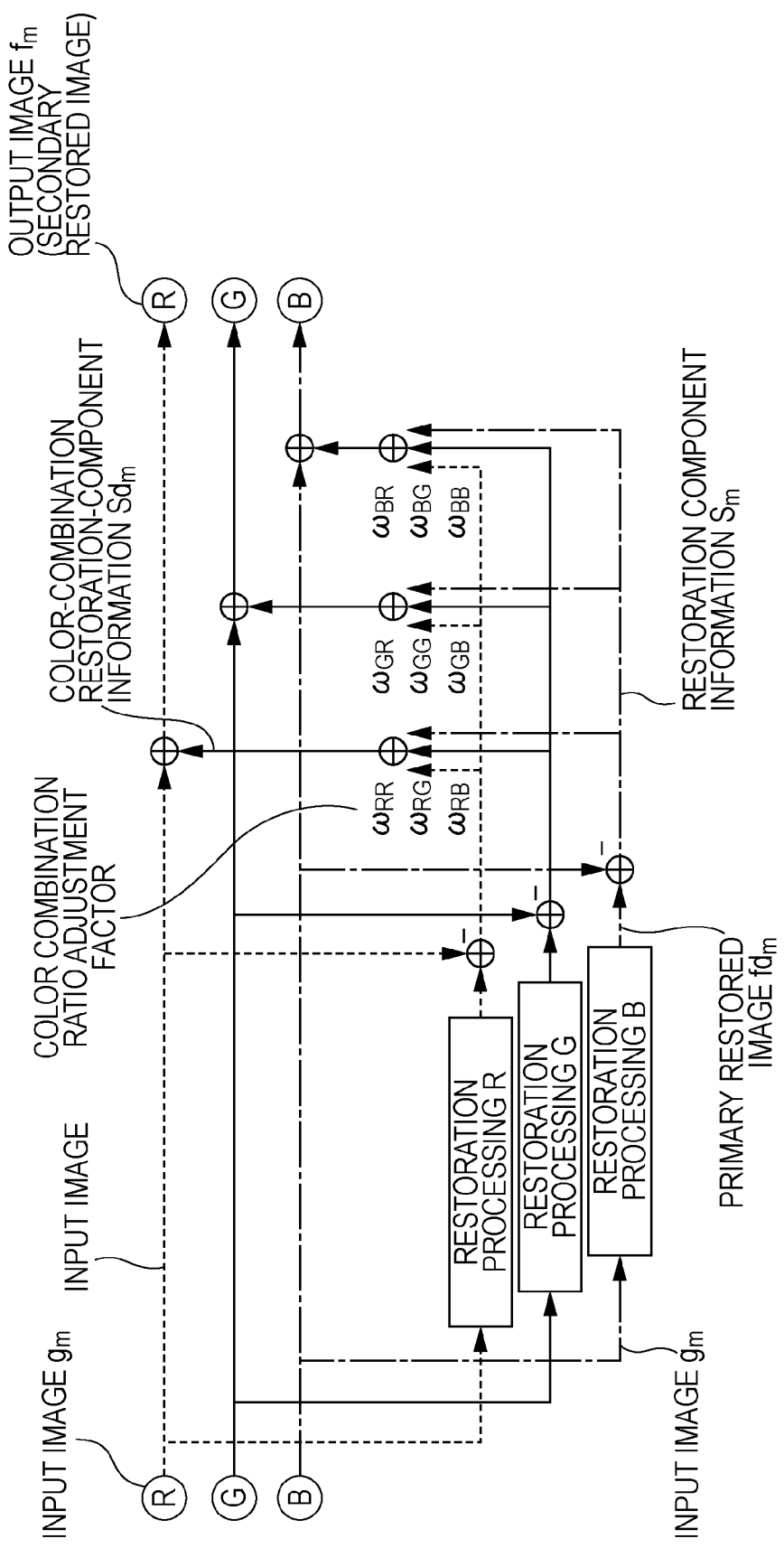
FIG. 2 illustrates an algorithm of image processing according to the first embodiment.

FIG. 2 illustrates an algorithm of processing performed by the image processing portion 104. The algorithm of image processing is described in detail using FIG. 2. In the following description, A indicates image information corresponding to g, f, fd, S, Sd, or the like illustrated in FIG. 2 and, for more details, indicates a signal value (luminance value) of a pixel. The affix m indicates a color component R, G, or B when color components of an image are red (R), green (G), and blue (B). That is, $A_m$ is ($A_R$, $A_G$, or $A_B$) indicating (R component of A, G component of A, or B component of A).

(Input Image $g_m$)

First, an input image $g_m$ is described. The input image $g_m$ may have a plurality of color components (e.g., R, G, B) for each pixel and may indicate lightness, hue, and chroma represented by LCH. A mosaic image having a signal value of a single color component for each pixel may be used. A demosaic image in which such a mosaic image is subjected to color interpolation processing (demosaicing processing) and each pixel has signal values of a plurality of color components may be used. A mosaic image can also be called a RAW image as an image before various kinds of image processing, such as color interpolation processing (demosaicing processing), signal-value conversion called gamma conversion, and picture compression known as JPEG, are performed.

For example, to obtain an input image $g_m$ having a plurality of color components by use of a single-panel image pickup element, color filters having different spectral transmittances can be arranged for pixels and a mosaic image having a signal value of a single color component for each pixel is obtained. In this case, if the above color interpolation processing is performed, an image having signal values of a plurality of color components for each pixel can be generated.

When a multiple-panel, for example, three-panel image pickup element is used, color filters having different spectral transmittances are arranged for the image pickup elements and an image having signal values of different color components varying among the image pickup elements is obtainable. In this case, because the image has the signal values of the color components corresponding to the respective pixels of the image pickup elements, an image having signal values of a plurality of color components for each pixel can be generated without color interpolation processing. The above-described image having a plurality of color components for each pixel as the input image $g_m$ is subjected to primary image restoration processing described below.

(Primary Image Restoration Processing)

Next, processing up to obtainment of a primary restored image $fd_m$ by performing primary image restoration processing on the input image $g_m$ is described. The processing described below is performed by the image processing portion 104.

The input image $g_m$ is a digital image obtained by the image pickup element 102 sensing light through the image pickup optical system 101. The image quality of that digital image $g_m$ is degraded by the optical transfer function (OTF) resulting from aberration of the image pickup optical system 101 including a lens and various optical filters. The input image $g_m$ having a plurality of color components (R, G, B) with the degraded image quality is subjected to restoration processing using an image restoration filter based on the OTF for each color component, and the primary restored image $fd_m$ is thus obtained.

Figure 3A:
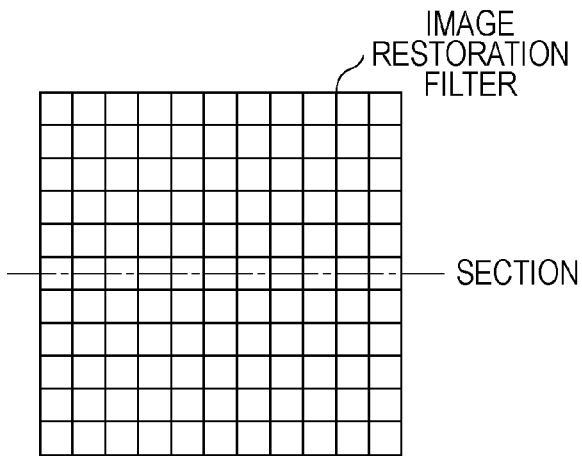
FIGS. 3A to 3C are illustrations for describing an example of an image restoration filter and selection of an image restoration filter according to the first embodiment.
Figure 3B:
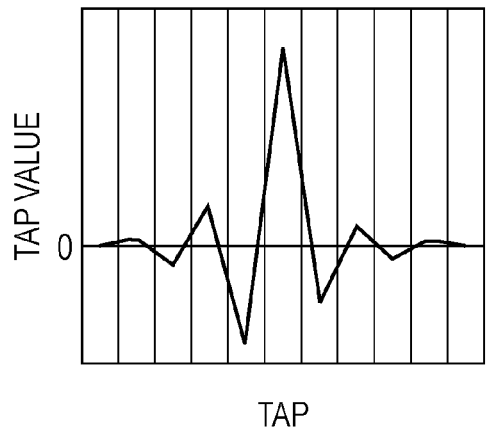

Here, a diagram for describing an image restoration filter is illustrated in FIG. 3A. For the image restoration filter, the number of taps can be determined depending on aberration characteristics of the image pickup optical system or required restoration accuracy. In FIG. 3A, as an example, a two-dimensional filter with 11×11 taps is used. The taps of the filter correspond to the respective pixels of an image, and, in image restoration processing (primary image restoration processing), convolution processing (convolution integration, product-sum) is performed. In the convolution processing, in order to improve a signal value of a certain pixel of an image, that pixel is matched to the center of the image restoration filter. Then, the product of a signal value and a value of a factor of the filter is calculated for each corresponding pixel of the image and the image restoration filter, and the total sum is replaced as a signal value of the central pixel. In FIG. 3A, the value within each tap is omitted; one cross-section of this image restoration filter is illustrated in FIG. 3B. Ideally, the distribution of values (factor values) of the taps of the image restoration filter serves to return the signal values spatially spread by aberration to an original single point. This image restoration filter can be obtained by calculation or measurement of the OTF of the image pickup optical system and performance of inverse Fourier transform on a function based on an inverse function thereof. Typically, because it is necessary to consider the effects of noise, a method of generating a Wiener filter or related various image restoration filters is selected and used. In addition, not only the image pickup optical system but also a factor for degrading the image quality in the course of image capture can be included in the generation. Examples of that factor include the aperture shape and aperture ratio of a pixel of a birefringent optical low-pass filter or an image pickup element. When a birefringent optical low-pass filter is used in the image pickup optical system, because a high-frequency component of the frequency characteristics of the OTF is suppressed, the image quality is degraded. The aperture shape and aperture ratio of a pixel of an image pickup element also have an influence on the frequency characteristics of the OTF. In addition, the spectral characteristics of a light source and the spectral characteristics of various wavelength filters can be a factor for degrading the image quality. An image restoration filter may preferably be generated based on the broadly defined OTF including the above. When an image is an RGB color image, three image restoration filters corresponding to RGB color components may be generated. For the first embodiment, an image restoration filter is generated based on a method of generating a Wiener filter.

Figure 3C:
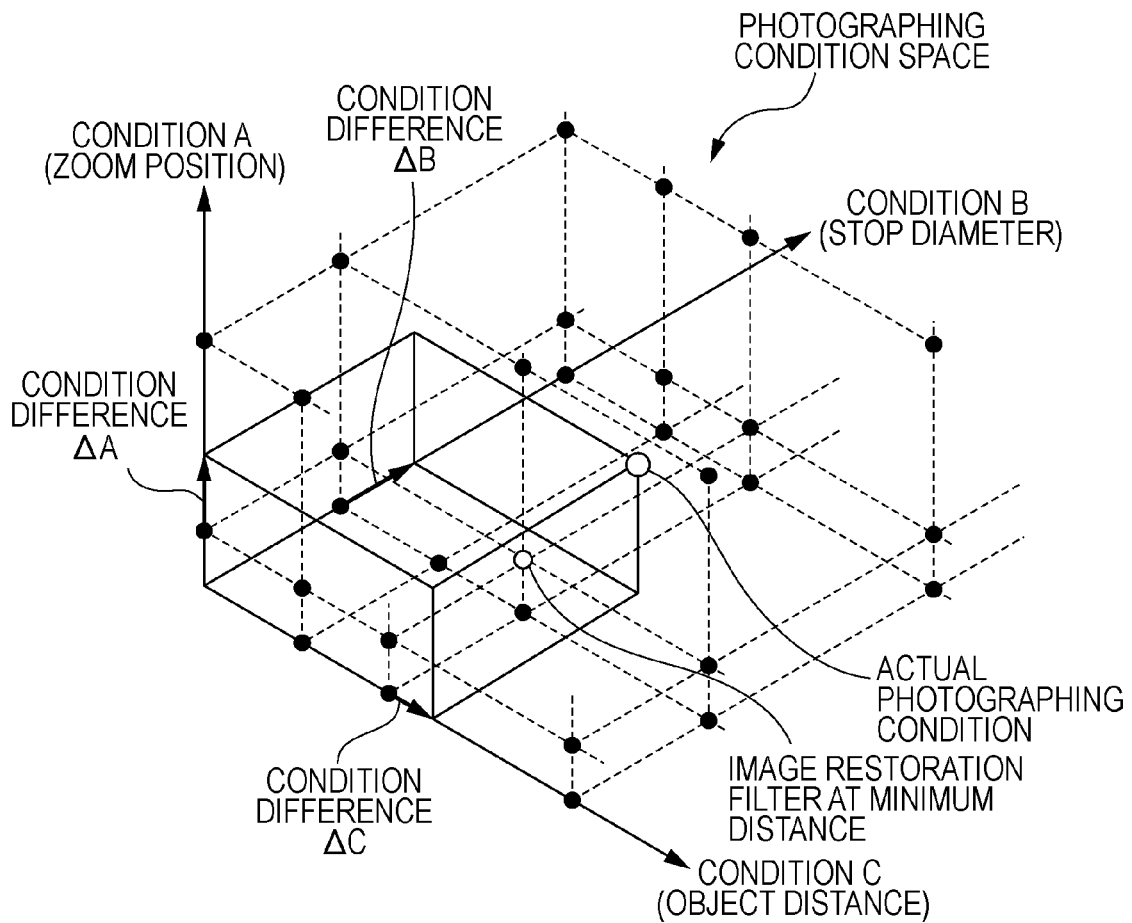

The image pickup apparatus according to the first embodiment stores a plurality of filters generated by the above method in the storage portion 108, and selects a proper image restoration filter or corrects an image restoration filter in accordance with a photographing condition. FIG. 3C is a diagram for describing selection and correction of an image restoration filter and a diagram of a group of image restoration filters stored in the storage portion 108. The image restoration filters stored in the storage portion 108 are discretely arranged in a photographing condition space having three conditions of a zoom position, a stop diameter, and an object distance as its axes. The space represented by coordinates illustrated in FIG. 3C is referred to as a photographing condition space. The coordinates of the points (black circles) in the photographing condition space indicate the positions of photographing conditions corresponding to the image restoration filters previously stored. In FIG. 3C, for the sake of description, the position of each of the filters is arranged at a grid point intersecting the conditions. However, the position of each of the filters may be displaced from the grid point. For the sake of illustrating the photographing conditions, a three-dimensional diagram having three conditions (zoom position, stop diameter, object distance) as its axes is used. However, a photographing condition space having four or more dimensions targeted for four or more conditions may be used. For example, a shutter speed, ISO speed ratings, white balance, and shooting mode can be used as axes.

Next, a specific method of selecting an image restoration filter illustrated in FIG. 3C is described. It is assumed that the condition indicated by the large white circle illustrated in FIG. 3C is the actual photographing condition detected. If a filter is located at the position of the actual photographing condition or in the vicinity of its pole, that filter is selected and used in image restoration processing (primary image restoration processing). If no filter is located at the position of the actual photographing condition or in the vicinity of its pole, the distance between the actual photographing condition and each stored photographing condition in the photographing condition space is calculated, and a filter present at the shortest distance is selected. For the photographing condition illustrated in FIG. 3C, because there is no filter corresponding to the large white circle, the filter at the position of the small white circle is selected. Another selecting method can be a method of selecting a filter by assigning a directional weight in a photographing condition space in filter selection and using the product of the distance and the directional weight in the photographing condition space as an evaluation function.

Next, processing of, after an image restoration filter is selected, correcting the selected filter to make that filter more suitable is described. First, in processing of selecting a filter, the distance between the actual photographing condition and each stored photographing condition in the photographing condition space is calculated, and a filter at the shortest distance is selected. This enables the condition difference to be minimized and thus enables the amount of correction to be reduced. In FIG. 3C, the filter located at the position of the small white circle is selected. The condition differences ΔA, ΔB, and ΔC between the actual photographing condition and each of the photographing conditions at the position of the selected image restoration filter are calculated. Correcting the selected image restoration filter on the basis of the calculated condition differences can generate the image restoration filter supporting the actual photographing condition (image restoration filter generating module). Another correction processing can be selecting a plurality of image restoration filters in the vicinity of the actual photographing condition and performing interpolation processing on the plurality of filters in accordance with the condition differences to generate an image restoration filter suited for the photographing condition. The interpolation processing here may be achieved by interpolation of factor values of corresponding taps of two-dimensional filters using linear interpolation, polynomial interpolation, or spline interpolation.

The optical transfer function (OTF) varies with the height of an image (position of an image) even in a certain photographing condition. Accordingly, in the above convolution processing, the image restoration filter may preferably be changed for each of regions into which the image is divided in accordance with the height of the image. Each of the regions into which the image is divided may preferably be one pixel. However, the regions can be changed if needed. That is, the image restoration filter can be moved on the image in scanning while the convolution processing is performed, and the filter can be changed in succession for each specific region. If the image restoration filter is a two-dimensional filter divided into 100 sections, an aberration of the image pickup optical system that is largely spread from the image forming position, such as spherical aberration, comma aberration, longitudinal chromatic aberration, or off-axis color flare, can be satisfactorily corrected. Asymmetrical aberrations, such as comma aberration, off-axis color flare, sagittal flare, curvature of field, and astigmatism, can also be accurately corrected.

Convolution of the image restoration filter selected or corrected (generated) by the above-described method and the input image $g_m$ generates the primary restored image $fd_m$. Performing convolution processing of the image restoration filter in an actual space on the input image $g_m$ enables the image to be restored without the Fourier transform or inverse Fourier transform of the image in the course of image restoration processing. Accordingly, the processing can be made at high speed.

(Processing of Generating Restoration Component Information)

Processing of generating restoration component information $S_m$ from the primary restored image $fd_m$ and input image $g_m$ is described using FIG. 2 again.

As indicated in Expression 1, for each corresponding pixel, a signal value of the original input image $g_m$ is subtracted from a signal value of the primary restored image $fd_m$ obtained by the above-described primary image restoration processing. With this processing, restoration component information $S_m$ (difference information) being the difference between the signal values for each color component is generated.

$$S_m = fd_m - g_m \qquad \text{(Expression 1)}$$

Then, the color combination ratio adjustment factor $\omega$ is applied to the restoration component information $S_m$, and color-combination restoration-component information Sdm is thus obtained. The generation of the color-combination restoration-component information Sdm can be represented as Expression 2. In Expression 2, $\Sigma$ for n indicates calculation of a sum for R, G, and B.

$$Sd_m = \sum_n^{RGB} \omega_{mn} S_n \qquad \text{(Expression 2)}$$

The color combination ratio adjustment factor $\omega$ is a factor for generating the color-combination restoration-component information Sdm. By color combination of the restoration component information $S_m$ for all color components (R, G, B) in accordance with the color combination ratio adjustment factor $\omega$, the color-combination restoration-component information Sdm for a certain color component is obtained. That is, the color combination ratio adjustment factor $\omega$ is a mixing ratio of the color components. The affix of $\omega$ in FIG. 2 indicates, for $\omega_{AB}$, a color combination ratio adjustment factor for a color component B to generate color-combination restoration-component information $Sd_A$ for a color component A. Therefore, processing of generating color-combination restoration-component information Sdm from restoration component information $S_m$ can be represented as Expression 2 and Expression 3, in which Expression 2 is developed for the color components m and n.

$$\begin{pmatrix} Sd_R \\ Sd_G \\ Sd_B \end{pmatrix} = \begin{pmatrix} \omega_{RR} & \omega_{RG} & \omega_{RB} \\ \omega_{GR} & \omega_{GG} & \omega_{GB} \\ \omega_{BR} & \omega_{BG} & \omega_{BB} \end{pmatrix} \begin{pmatrix} S_R \\ S_G \\ S_B \end{pmatrix} \qquad \text{(Expression 3)}$$

When color components forming an image are R, G, and B, the color combination ratio adjustment factor $\omega$ can be represented as a vector having 3×3 factor elements. By combining the restoration component information $S_m$ in accordance with this color combination ratio adjustment factor $\omega$, the color-combination restoration-component information $Sd_m$ is generated. Generation of color-combination restoration-component information $Sd_R$ for the R component is described as an example. The color-combination restoration-component information $Sd_R$ for R is generated by multiplying the signal values of pixels of the restoration component information $S_R$, $S_G$, and $S_B$, for R, G, and B by the color combination ratio adjustment factors $\omega_{RR}$, $\omega_{RG}$, and $\omega_{RB}$, respectively, and combining them of the color components. The combining is generating a single image by computing a signal value for each corresponding pixel of a plurality of images. The same applies to other color components. The color-combination restoration-component information Sdm is generated by the above-described processing.

In such a way, the use of the signal values of a plurality of color components including a certain color component in obtaining a signal value of a pixel of the certain color component enables color-combination restoration-component information Sdm, which is not obtainable from traditional image restoration processing, to be generated.

(Processing of Generating Secondary Restored Image)

Next, processing of generating a secondary restored image $f_m$ from the color-combination restoration-component information Sdm generated in the above-described processing of generating restoration component information is described. Adding the color-combination restoration-component information Sdm and the input image $g_m$ for each color component enables the secondary restored image $f_m$ to be obtained. The generation of the secondary restored image $f_m$ can be represented as Expression 4. This secondary restored image $f_m$ is an output image.

$$\begin{aligned} f_m &= g_m + Sd_m \\ &= g_m + \sum_n^{RGB} \omega_{mn}(fd_n - g_n) \end{aligned} \qquad \text{(Expression 4)}$$

A summary of the above-described processing is described below. An input image ($g_m$) having a plurality of color components is subjected to image restoration processing, and a primary restored image ($fd_m$) is thus generated. The difference between the primary restored image ($fd_m$) and the input image ($g_m$) is calculated, and difference information ($S_m$) for each of the plurality of color components is thus generated. Then, a secondary restored image ($f_m$) is generated using the difference information ($S_m$). In secondary image restoration processing, referring to the R color component, color-combination restoration-component information ($\omega_{RR}S_R + \omega_{RG}S_R + \omega_{RB}S_R$) based on the difference information for the plurality of color components is combined with the single color component ($g_R$) of the input image. That is, the use of difference information for each of G and B colors, in addition to that for R color, in image restoration for R color enables chromatic blurring of R color to be small, in comparison with when only difference information for R color is used. In other words, image processing based on the difference between the amounts of blurring of color components is performed.

This enables the sharpness in primary image restoration processing and the degree of chromatic blurring that can be caused by the primary image restoration processing to be balanced. Accordingly, the image $f_m$ with reduced unnatural chromatic blurring can be generated.

Here, the color combination ratio adjustment factor $\omega$ indicated in Expression 3 is described in detail. First, two concrete examples of the color combination ratio adjustment factor $\omega$ are described.

One is the color combination ratio adjustment factor $\omega$ for obtaining, as the secondary restored image $f_m$, the same image as the primary restored image $fd_m$. When the elements on the diagonal are unity and all other elements are zero in the color combination ratio adjustment factor $\omega$ in Expression 3 (identity matrix), the color-combination restoration-component information $Sdm$ is the same as the restoration component information $S_m$ for its own color component. This is the setting of a factor when the secondary restored image $f_m$ is output as the same image as the primary restored image $fd_m$. In this case, for the secondary restored image $f_m$, an aberration component is corrected as much as possible. Therefore, if an unexpected aberration occurs, chromatic blurring will become more noticeable after restoration processing is performed, so the image quality will be degraded. However, as long as such an unexpected aberration does not occur, a satisfactory image is obtainable.

Second is the color combination ratio adjustment factor $\omega$ for avoiding chromatic blurring. When all of the entries in the color combination ratio adjustment factor $\omega$ in Expression 3 are 1/3, the color-combination restoration-component information $Sdm$ is one in which the restoration component information $S_m$ for all color components is averaged. That is, color-combination restoration-component information is one in which difference information for the plurality of color components is averaged with respect to a single color component of an input image. Accordingly, color-combination restoration-component information $Sd_R$, $Sd_G$, and $Sd_B$ is all the same. That the color-combination restoration-component information $Sd_m$ is the same for all the color components means there is no difference between additional information for the color components in combining the color-combination restoration-component information $Sd_m$ with the input image $g_m$ in subsequent processing. Therefore, no chromatic blurring occurs. However, because aberration information for color components is averaged, the degree of restoration, i.e., the sharpness is degraded, in comparison with when the primary restored image $fd_m$ is an output image, as described above as the first example. Even when the restoration component information $S_m$ is averaged, because considerable positive correlation (similarity) is present among the restoration component information $S_R$, $S_G$, and $S_B$, the sharpness of the secondary restored image $f_m$ is improved in comparison with the input image $g_m$. Accordingly, setting all of the entries of the color combination ratio adjustment factor $\omega$ at 1/3 prevents the occurrence of chromatic blurring.

Setting the color combination ratio adjustment factor $\omega$ as described above enables an image having a desired image quality to be obtained. This is because, the use of a plurality of color components including a certain color component to obtain a restored image for the certain color component enables the degrees of restoration to be adjustable among the color components. Color-combination restoration-component information for only one color component may be used. Alternatively, color-combination restoration-component information based on difference information for a plurality of color components may be combined with the color components of an input image. Specifically, the G component causes less chromatic aberration, in comparison with the R and B components. This property may be used to perform image restoration processing in which, for the R and B colors, color-combination restoration-component information based on difference information is employed and, for the G color, difference information on G light is employed.

Figure 4A:
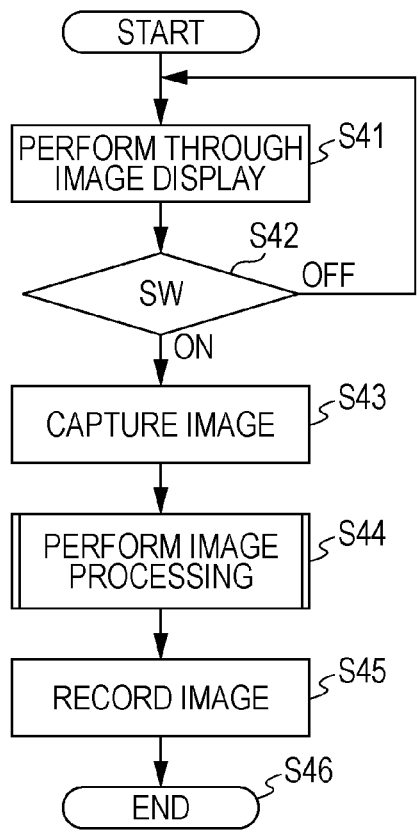
FIGS. 4A and 4B illustrate operational flows of the image pickup apparatus according to the first embodiment.

Next, operation of the image pickup apparatus performing the above-described image processing is described using FIG. 4A. In step S41, light from an object reaches the image pickup element 102 through the image pickup optical system 101. The light detected by the image pickup element 102 is converted into an analog electrical signal. The analog signal is converted into a digital signal by the A/D converter 103. The system controller 110 performs through image display of image data generated by the image pickup element 102. Through image display indicates real-time video displaying of image data of an object state continuously generated by the image pickup element 102 on the display portion 105.

Next, in step S42, the system controller 110 determines whether a shutter switch signal (hereinafter referred to as SW signal) is on. When the SW signal is on, the system controller 110 performs autofocus (AF) processing to achieve the focus of the image pickup optical system 101, performs autoexposure (AE) processing to determine a stop value and a shutter time (shutter speed), and stores them in the storage portion 108, and flow proceeds to step S43. When the SW signal is off, the processing step returns to S41.

In step S43, in response to the time of detecting the SW signal, the system controller 110 starts exposure processing for the image pickup element 102 in accordance with a dose of light calculated from image data obtained up to that time. Image capture processing of performing development processing on image data generated by the exposure processing is executed, its result is stored in the storage portion 108, and flow proceeds to step S44.

In step S44, the image stored in the storage portion 108 as an input image is subjected to the above-described image processing by the image processing portion 104, and at the stage of obtainment of a result of the processing, flow proceeds to step S45. A flow of the processing by the image processing portion 104 in step S44 is described later.

Then, in step S45, the system controller 110 executes recording processing of writing image data obtained by the image processing or image capture processing as an image file into the image storage medium 109.

For the processing of FIG. 4A, in step S42, detection of SW in one stage is illustrated. However, detection of SW in two stages may be used. In this case, in response to detection of an ON state of the first SW signal, AF processing and AE processing may be performed, and only when a SW signal in the second stage is detected in the ON state of the first SW signal, flow may proceed to the image capture processing.

Figure 4B:
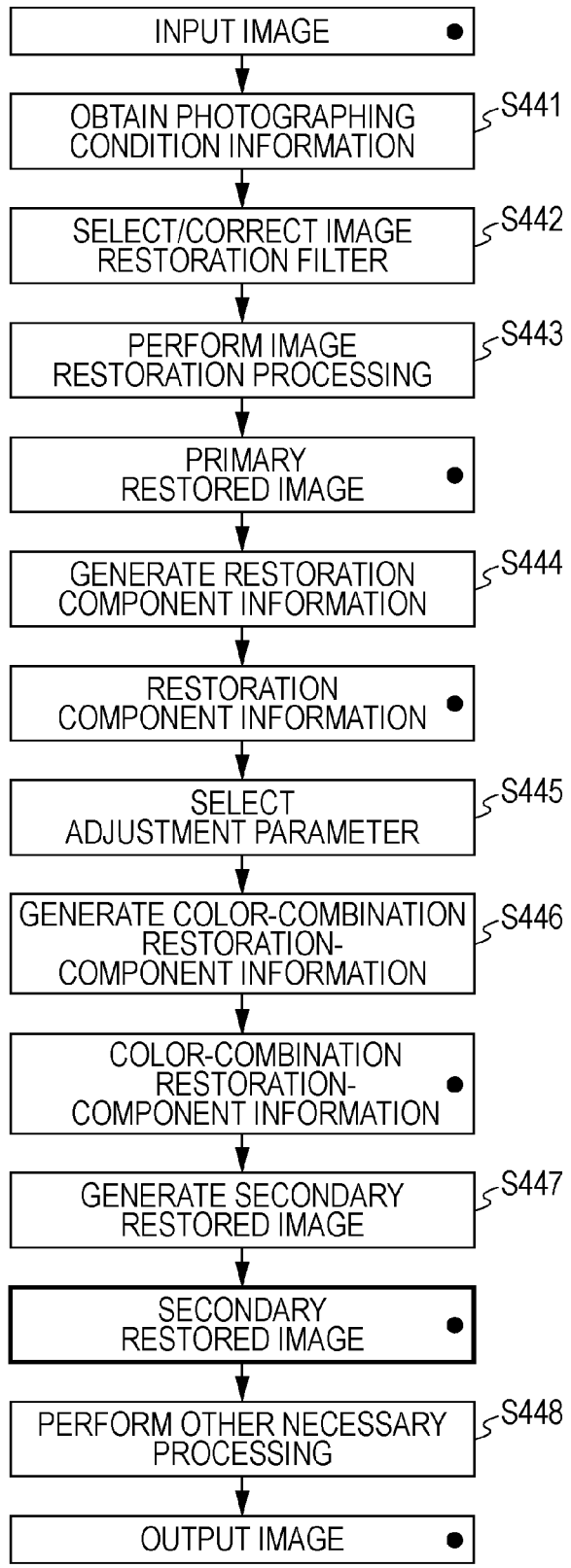

Next, a flow of the image processing in step S44 illustrated in FIG. 4A is described using FIG. 4B. An algorithm of this image processing is previously explained. The black circles in the drawing indicate pixel data obtained or generated in the course of the processing.

First, the image processing portion 104 obtains an input image. The input image is a mosaic image having one piece of color component information for each pixel. In step S441, photographing condition information, such as about a lens position and a stop value, is obtained from the condition detecting portion 107 or the storage portion 108. Next, in step S442, an image restoration filter is selected or corrected in response to the photographing condition obtained in step S441. The selection or correction of the image restoration filter is previously described. In step S443, the input image is subjected to restoration processing (primary image restoration processing) using the image restoration filter selected or corrected in step S442 to generate a primary restored image.

Next, in step S444, restoration component information is generated from the difference between a signal value of each pixel of the input image and that of the primary restored image. Because the input image is a mosaic image having one piece of color component information for each pixel, color interpolation processing (demosaicing processing) between the input image and the restoration component information is performed here in order to carry out image combining among the color components afterwards.

Then, in step S445, a set value of an adjustment parameter of each of the color combination ratio adjustment factor ω and the restoration strength adjustment factor μ is obtained. The restoration strength adjustment factor μ is described later. Then, in step S446, computation described in Expression 3 is performed on the restoration component information for each color component using the adjustment parameter to generate color-combination restoration-component information.

Only one of the color combination ratio adjustment factor ω and the restoration strength adjustment factor μ as the adjustment parameter may be used in some cases. For the present embodiment, depending on the image pickup state or the height of an image, the adjustment parameter is automatically selected from set values prepared in advance. The adjustment parameter may be automatically changed based on determination of the feature value of a pixel from the image. Examples of the feature value of a pixel include a pixel value of that pixel and the difference between the pixel value of that pixel and that of its neighboring pixel.

Next, in step S447, the color-combination restoration-component information obtained in step S446 is combined with the input image to generate a secondary restored image (Expression 4). This processing can be performed on an image subjected to color interpolation processing. Alternatively, color component information arrangement corresponding to the mosaic image may be returned using a mask placed on the color-combination restoration-component information for each color component, and it can be combined with the input image in the mosaic state.

Next, in additional processing of step S448, other necessary processing is performed, and the image is then output. Examples of the other necessary processing here include color interpolation processing (demosaicing processing) when the secondary restored image is in a mosaic image state. Other examples include shading correction, distortion aberration correction, and lateral chromatic aberration correction. Various kinds of image processing including the other processing described here can also be inserted before, after, or into the above-described flow if needed. Such an example case is described later.

Figure 5A:
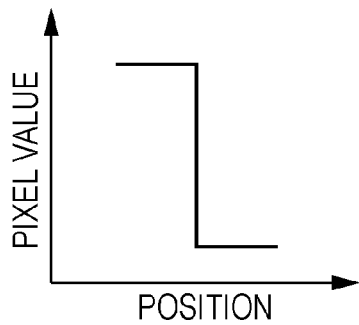
FIGS. 5A to 5F illustrate chromatic blurring in comparison with a traditional example.
Figure 5B:
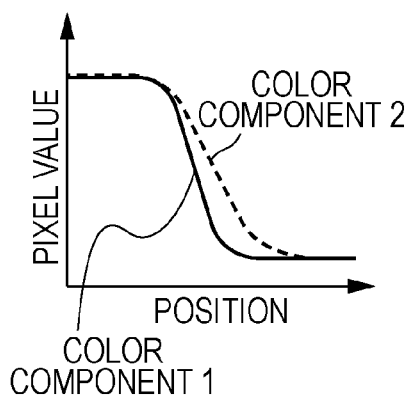
Figure 5C:
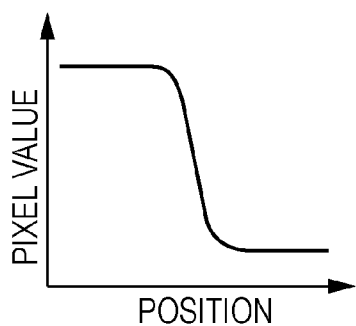
Figure 5D:
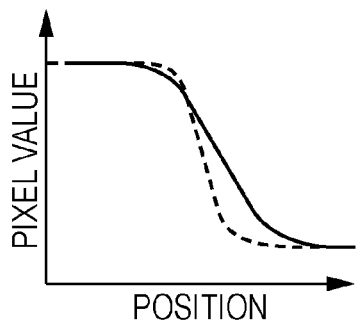
Figure 5E:
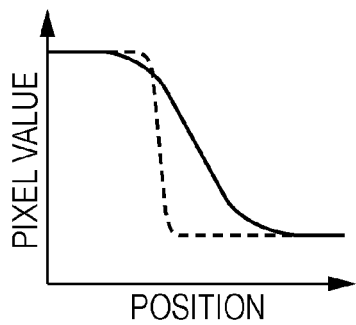
Figure 5F:
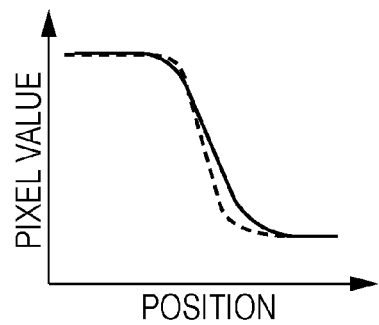

Advantages occurring when the above-described processing is performed are described using FIGS. 5A to 5F. FIGS. 5A to 5F illustrate edges of an object and its picked-up image, and the horizontal axis indicates a position (pixel) on the image and the vertical axis indicates a pixel value. FIG. 5A illustrates edges of an object. FIG. 5B illustrates a captured image prior to restoration when the edges illustrated in FIG. 5A are at an in-focus distance. FIG. 5C illustrates a restored image when traditional image restoration processing is performed on the image of FIG. 5B. FIG. 5D illustrates a picked-up image prior to restoration when the edges illustrated in FIG. 5A are at an out-of-focus distance. FIG. 5E illustrates a restored image when traditional restoration processing is performed on the image of FIG. 5D. FIG. 5F illustrates a restored image when image restoration processing according to the present invention is performed on the image of FIG. 5D.

For the edges illustrated in FIG. 5B, because of chromatic aberration in a depth direction, the color component 1 and the color component 2 have differently spread aberrations. For example, when the color component 1 indicated by the solid line is the G channel and the color component 2 indicated by the broken line is the R channel, the edges can have red chromatic blurring. If the edges are at an in-focus distance, as illustrated in FIG. 5C, an image can be restored by traditional image restoration processing without causing chromatic blurring. However, if the object is located at a position that is not at the in-focus distance, as illustrated in FIG. 5D, the edges have green chromatic blurring. If they are subjected to restoration processing using a restoration filter suited for the in-focus distance, that is, a restoration filter expecting the state illustrated in FIG. 5B, the color component 2 is corrected more largely, and accordingly, the difference between the color components 1 and 2 is increased. That is, as illustrated in FIG. 5E, chromatic blurring occurs, and green chromatic blurring in the edges is magnified. However, if image processing according to the present invention is performed, even for at an out-of-focus distance as illustrated in FIG. 5D, chromatic blurring magnifying the state of chromatic aberration can be reduced, and a restored image with reduced chromatic blurring as illustrated in FIG. 5F is obtainable.

Other advantages are described using FIGS. 6A and 6B. FIG. 6A illustrates a flow of traditional image restoration processing. FIG. 6B illustrates a flow of the image processing described in the first embodiment. For traditional image processing, an input image is obtained in step S61a, and an image restoration filter is calculated and generated every time the degree of restoration is changed in step S62a. Next, in step S63a, image restoration processing using the restoration filter generated in step S62a to output a restored image. Next, in step S64a, the restored image is evaluated to determine whether the image is to be output without any processing or the degree of restoration is to be changed. Here, when the image is to be output without any processing, flow proceeds to step S65a, where the restored image generated in S63a is output. In contrast, when it is determined that the degree of restoration is to be changed, flow returns to step S62a, and the image restoration filter must be recalculated.

FIG. 6B illustrates a flow of image restoration processing according to the first embodiment. In step S61b, a captured image is obtained as an input image. Next, in step S62b, an image restoration filter is calculated and generated using a parameter as an initial value (e.g., zoom position, stop diameter, object distance). Without through this step, an image restoration filter prepared in advance as an initial value may be used. Then, in step S63b, the input image is subjected to image restoration processing (primary image restoration processing) using the filter to output a primary restored image. In step S64b, the primary restored image is subjected to image correction processing (secondary image restoration processing) using an adjustment parameter prepared in advance to generate a secondary restored image. In step S65b, the secondary restored image is evaluated to determine whether the image is to be output without any processing or the degree of restoration is to be changed. When the degree of restoration is to be changed, the adjustment parameter is changed and the image correction processing is performed. This adjustment parameter is the color combination ratio adjustment factor ω or the restoration strength adjustment factor μ, which is described below. Here, processing of generating restoration component information and processing of generating a secondary restored image, other than primary image restoration processing described with FIG. 2, are collectively referred to as the image correction processing. The adjustment parameter used in the image correction processing in S64b may be a parameter prepared in advance. Alternatively, the image correction processing may be performed using an adjustment parameter specified by a user or an adjustment parameter automatically determined from image information.

As illustrated in FIG. 6, for a traditional method (FIG. 6A), to change the degree of restoration, recalculation of the image restoration filter is necessary, whereas in contrast, for the present invention (FIG. 6B), recalculation is not necessary. Therefore, a load of image processing can be reduced, and the processing can be faster.

Second Embodiment

As indicated in Expression 3 in the first embodiment, the color combination ratio adjustment factor ω has nine degrees of freedom in setting. Therefore, setting each element value may be complicated. One example case is setting values of the color combination ratio adjustment factor ω one by one on an image pickup apparatus or an image processing system by an ordinary user using a button of the operating portion 111 and changing this color combination ratio adjustment factor ω.

For the second embodiment, an example in which dependencies of the elements of the color combination ratio adjustment factor ω enable nine parameters to be set by only one parameter is described. The second embodiment is the same as the first embodiment, except for a way of setting a value of the color combination ratio adjustment factor, and the same description is not repeated here.

Dependencies of the elements of the color combination ratio adjustment factor ω are required to be a relation in which the balance between the degree of restoration and the degree of the occurrence of chromatic blurring is adjustable. Therefore, one example method of determining the color combination ratio adjustment factor ω is described below. First, two constraints are added. A first constraint is setting the sum for each row of the matrix ω in Expression 3 at one, as indicated by Expression 5.

$$\sum_{n}^{RGB} \omega_{mn} = 1 \quad \text{(Expression 5)}$$

This means that the mixing ratio of the restoration component information $S_R$, $S_G$, and $S_B$ to generate, for example, the color-combination restoration-component information $Sd_R$ for the R component is normalized. Normalizing the mixing ratio in this way enables easy comparison to determine what rate is used in weighting each of different pieces of color-combination restoration-component information $Sd_m$.

A second constraint is setting the sums for each column of the matrix ω in Expression 3 at one, as indicated by Expression 6. This means that in generating color-combination restoration-component information $Sd_R$, $Sd_G$, and $Sd_B$, the restoration component information $S_R$, $S_G$, and $S_R$ is distributed to the respective color components and all of the information is fully used.

$$\sum_{m}^{RGB} \omega_{mn} = 1 \quad \text{(Expression 6)}$$

When the above two constraints are added, the color combination ratio adjustment factor ω can be represented as Expression 7.

$$\omega = \begin{pmatrix} \omega_{RR} & 1 - \omega_{GG} - \omega_{BG} & \omega_{RB} \\ \omega_{GR} & \omega_{GG} & 1 - \omega_{BB} - \omega_{RB} \\ 1 - \omega_{RR} - \omega_{GR} & \omega_{BG} & \omega_{BB} \end{pmatrix} \quad \text{(Expression 7)}$$

In order to further reduce the degree of the occurrence of chromatic blurring while maintaining the degree of restoration, it is preferable that the degree of similarity of color-combination restoration-component information $Sd_m$ for color components be high, that is, the difference of $Sd_m$ be small. For the first embodiment, when ω=1/3, because there is no difference between the color-combination restoration-component information $Sd_m$ for color components, the degree of chromatic blurring is minimum, that is, chromatic blurring does not occur. This means that the restoration component information $S_m$ for a certain color component is required to be allocated to the color-combination restoration-component information $Sd_m$ for color components as evenly as possible. Accordingly, smaller distribution of each column in Expression 7 can reduce the degree of the occurrence of chromatic blurring. On the basis of this, when the distribution of each column in Expression 7 is minimized, the color combination ratio adjustment factor ω can be represented as Expression 8.

$$\omega = \begin{pmatrix} \omega & (1-\omega)/2 & (1-\omega)/2 \\ (1-\omega)/2 & \omega & (1-\omega)/2 \\ (1-\omega)/2 & (1-\omega)/2 & \omega \end{pmatrix} \quad \text{(Expression 8)}$$

Expression 8 has ω as only one parameter to be set. Accordingly, the balance between the degree of restoration and the degree of the occurrence of chromatic blurring can be easily adjustable. In Expression 8, if ω=1, the matrix ω is an identity matrix, and both the degree of restoration and the degree of the occurrence of chromatic blurring are highest. If ω=1/3, all the elements of the matrix ω are 1/3, and the degree of restoration decreases and chromatic blurring does not occur. Accordingly, reducing the color combination ratio adjustment factor ω in the range 1/3 ≤ω≤1 enables adjustment of reducing chromatic blurring.

Setting the color combination ratio adjustment factor ω in the above-described way enables a user to easily obtain a desired image quality. Also from the viewpoint of the provider of an image pickup apparatus and an image processing system, controlling the adjustment parameter with a small degree of freedom leads to improvement in working efficiency in a process of developing an apparatus and a process of manufacturing it.

In the first embodiment and the second embodiment, several examples of a method of determining the color combination ratio adjustment factor ω are illustrated.

However, the determining method is not limited to the above examples. Expression 8 is merely an example for easily determining the degree of restoration and the degree of the occurrence of chromatic blurring using one parameter ω to be set. For example, if all the elements of the matrix ω are zero, the color-combination restoration-component information $Sd_m$ for all color components is zero. Therefore, the secondary restored image $f_m$ is the input image $g_m$ itself. As described above, adjustment of the color combination ratio adjustment factor ω in the range 1/3 ≤ω≤1 enables an output image adjusted in the range between an input image and an image at a maximum degree of restoration to be obtained. Furthermore, restoration can be more enhanced by setting Expression 5 at more than 1.

The degree of freedom in setting for each element of the matrix ω is not limited to one; adjustment based on a different degree of freedom or a different constraint is possible. For example, with the setting based on Expression 7, six degrees of freedom are possible.

As described above, appropriately setting the color combination ratio adjustment factor ω, combining the restoration component information $S_m$ for color components, and controlling similarity of the color-combination restoration-component information $Sd_m$ for the color components enables a good-quality image to be obtained. In other words, it is difficult to design an image restoration filter supporting each state of aberration occurring in a variety of actual image captures. Accordingly, adjustment of the degree of restoration and the degree of the occurrence of chromatic blurring in the above-described way enables image processing to flexibly support various image capture conditions.

Third Embodiment

In the first embodiment and the second embodiment, examples using the color combination ratio adjustment factor ω are described. In a third embodiment, an example using the restoration strength adjustment factor μ being a parameter for adjusting the degree of the occurrence of chromatic blurring to further improve usability is described.

To avoid redundant description, only differences from the first embodiment are described. Specifically, of the image processing illustrated in the first embodiment, the primary image restoration processing and the processing of generating restoration component information are the same, so the description thereof is omitted. Only different processing of generating a secondary restored image is described.

The obtainment of the input image $g_m$ and the secondary restored image $f_m$ that is strongly corrected by cancelling the constraint in Expression 5 of setting the sum of each row of the color combination ratio adjustment factor ω in Expression 3 is previously described. However, when the constraint is cancelled, because of a high degree of freedom in determining the color combination ratio adjustment factor ω, it is difficult to determine it by one parameter as in Expression 8. For the third embodiment, a method by which the input image $g_m$ and a strongly corrected image are obtainable as the secondary restored image $f_m$ while using a method of determining the color combination ratio adjustment factor ω in Expression 8 is described.

Although the secondary restored image $f_m$ is obtainable from Expression 4, a method represented in Expression 9 is used here.

$$f_m = g_m + \mu Sd_m \qquad \text{(Expression 9)}$$

$$= g_m + \mu \sum_{n}^{RGB} \omega_{mn}(fd_n - g_n)$$

Figure 7:
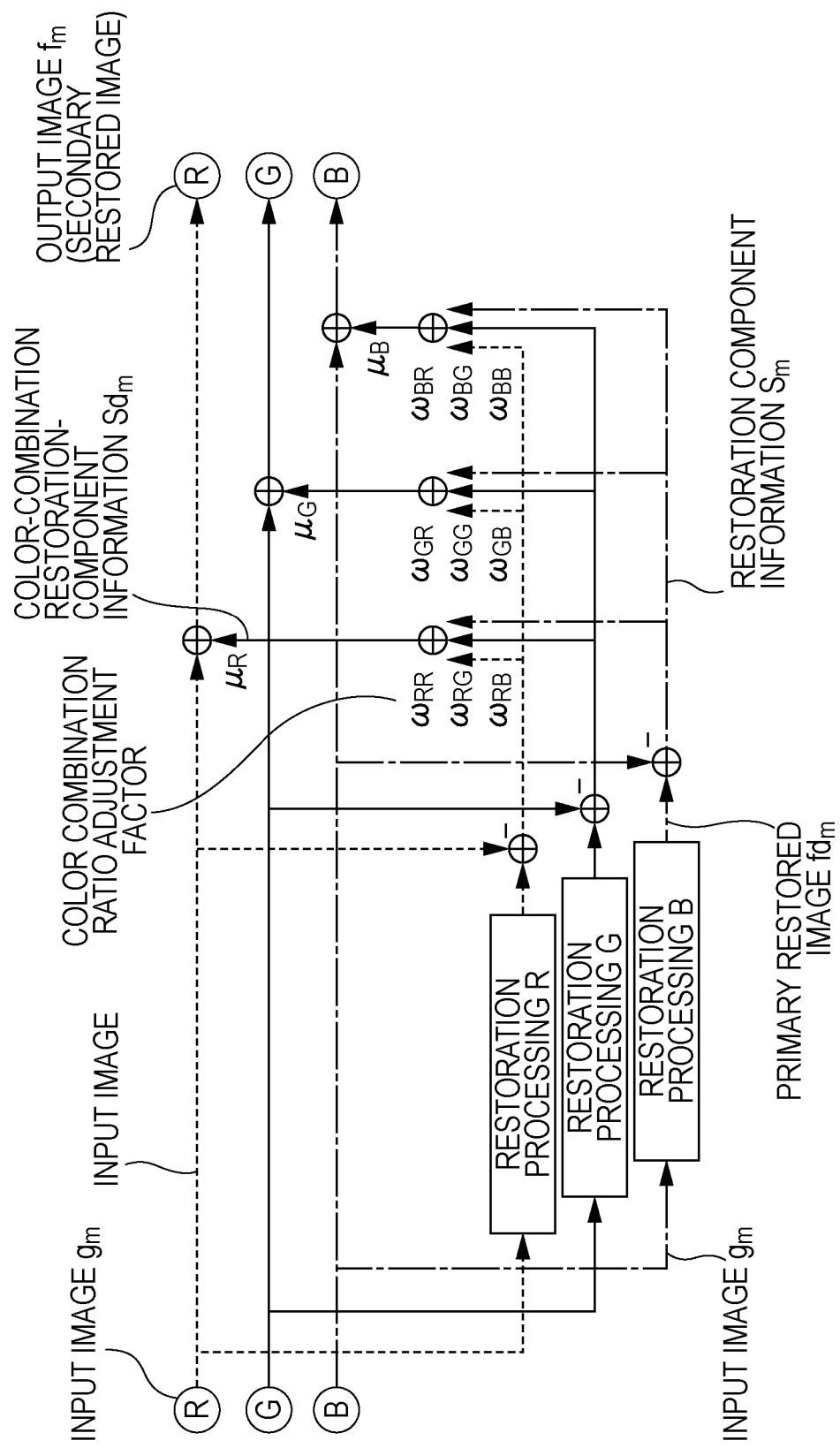
FIG. 7 illustrates an algorithm of image processing according to a third embodiment.

Expression 9 is the one obtained by multiplying the matrix ω determining by Expression 8 by the restoration strength adjustment factor μ. When μ=0, because the second term in the right-hand side of Expression 9 is zero, the input image $g_m$ itself is obtained as the secondary restored image $f_m$. When μ=1, Expression 9 is the same as Expression 4, and the secondary restored image $f_m$ based on the color combination ratio adjustment factor ω determined by Expression 8 is obtainable. The fundamental range of the restoration strength adjustment factor μ is 0≤μ≤1. However, if μ>1, a strongly corrected image is obtainable. That is, if the restoration strength adjustment factor μ is changed for each color component, the degree of restoration is adjustable for each color component. FIG. 7 illustrates of an algorithm occurring when this restoration strength adjustment factor μ is introduced.

The use of the restoration strength adjustment factor μ is effective for adjusting the degree of restoration for each color component when, because of a factor such as spectral variations of an illumination light source for an object or manufacturing errors of an image pickup optical system, the optical transfer function (OTF) varies among color components and the balance of chromatic aberration varies. A change in spectral characteristics of an illumination light source means a change in strength ratio for each wavelength. Therefore, the amount of aberration varies among color components. Accordingly, setting the restoration strength adjustment factor μ for each color component in response to spectral characteristics at image capture enables the secondary restored image $f_m$ suited for each color component to be obtained. One possible effect occurring when there are manufacturing errors in an image pickup optical system is different degrees of degradation of an image at symmetrical locations. Such different degrees of degradation may appear in the image as a difference, such as blurring or relative chromatic blurring for each color component. As for the blurring, the manufacturing errors can be compensated for by setting the restoration strength adjustment factor μ in response to variations in the amount of blurring depending on a position in the image. As for the chromatic blurring, the manufacturing errors can be compensated for by setting the restoration strength adjustment factor μ for each color component in response to variations in the amount of chromatic blurring depending on a position in the image.

Here, linearity of the degree of restoration of the secondary restored image $f_m$ with respect to changes in the color combination ratio adjustment factor ω and the restoration strength adjustment factor μ is described. The primary restored image $fd_m$ equal to the secondary restored image $f_m$ having the maximum degree of restoration when the color combination ratio adjustment factor ω and the restoration strength adjustment factor μ are both one is used as the reference. Similarity between the primary restored image $fd_m$ and the secondary restored image $f_m$ is defined as an evaluation function $J_m$ of Expression 10.

$$J_m = 1 - \frac{\|fd_m - f_m\|_2}{\sqrt{XY}} \qquad \text{(Expression 10)}$$

The double vertical lines with the affix 2 in the right-hand side indicate a two-dimensional norm, and X and Y of the denominator indicate the number of pixels in the horizontal direction and vertical direction of an image. When Expression 9 and Expression 8 are substituted as the secondary restored image $f_m$ and the color combination ratio adjustment factor ω, respectively, because the evaluation function $J_m$ is a linear expression with respect to the color combination ratio adjustment factor ω and the restoration strength adjustment factor μ, the degree of restoration is linearly adjustable.

Figure 8:
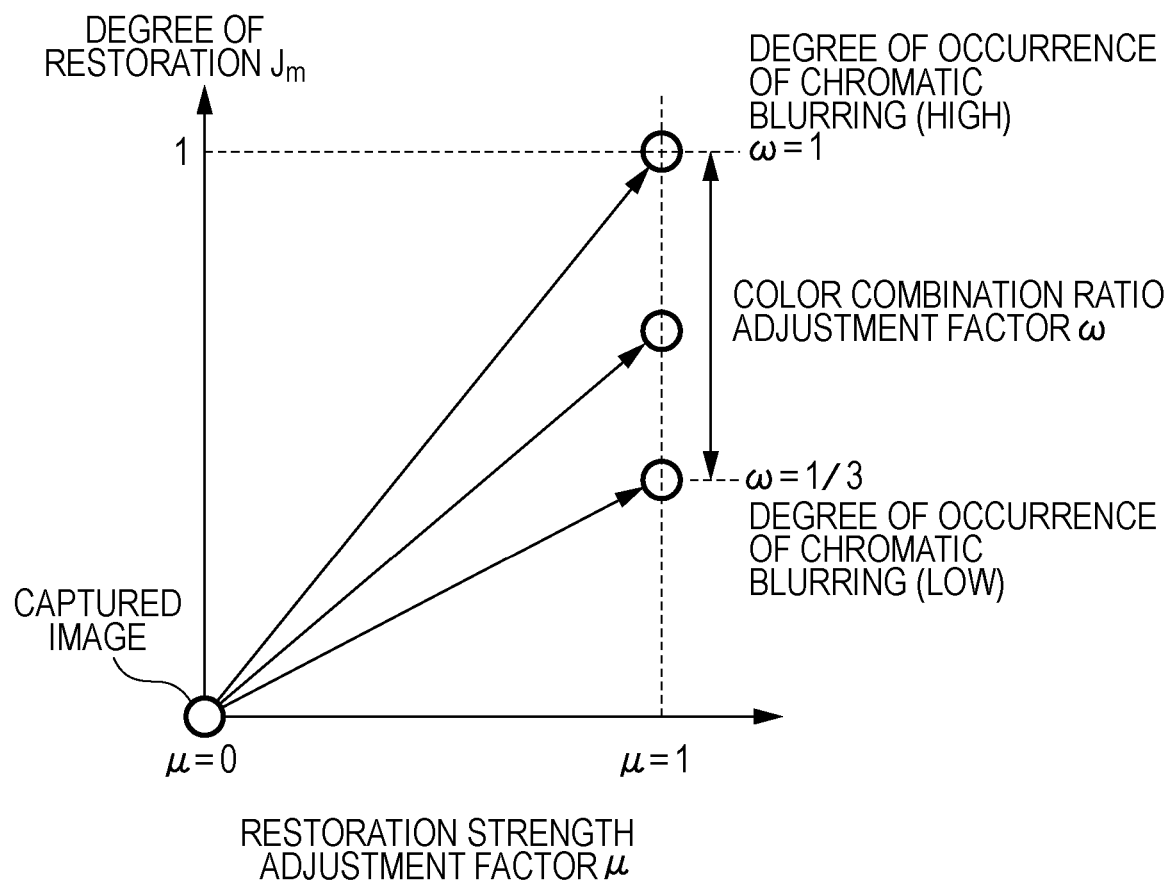
FIG. 8 illustrates a relationship between a color combination ratio adjustment factor $\omega$ and a restoration strength adjustment factor $\mu$.

The use of the restoration strength adjustment factor μ enables the degree of restoration to be adjustable while the color combination ratio adjustment factor ω can be easily determined as shown in Expression 8. Separating the color combination ratio adjustment factor ω and the restoration strength adjustment factor μ enables adjustment of the balance between the degree of restoration and the degree of the occurrence of chromatic blurring using the color combination ratio adjustment factor ω and enables dynamic adjustment of the degree of restoration of a dynamic image using the restoration strength adjustment factor μ. FIG. 8 is a diagram illustrating changes of the degree of restoration performed by that adjustment. Changing the color combination ratio adjustment factor ω enables adjustment of the occurrence of chromatic blurring, and changing the restoration strength adjustment factor μ enables adjustment of the degree of restoration between the set color combination ratio adjustment factor ω and the input image. That is, the color combination ratio adjustment factor ω is used in adjusting the combination ratio among color components, whereas the restoration strength adjustment factor μ is used in changing the degrees of restoration for all of the R, G, and B color components. Both the color combination ratio adjustment factor ω and the restoration strength adjustment factor μ may be used in image restoration (secondary image restoration). Alternatively, the color combination ratio adjustment factor ω may have a previously set value, and the degree of restoration may be adjusted by changing only the restoration strength adjustment factor μ.

Figure 9A:
FIGS. 9A and 9B illustrate experimental results exhibiting linearity of the color combination ratio adjustment factor $\omega$ and the restoration strength adjustment factor $\mu$.
Figure 9B:
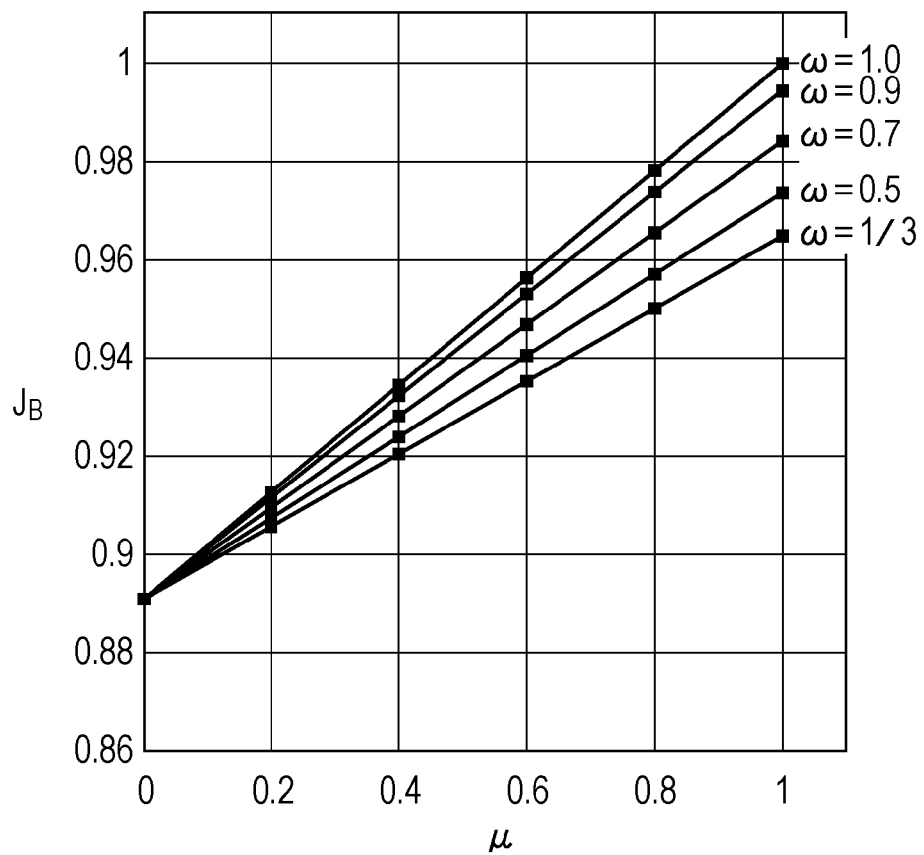

FIG. 9B illustrates experimental results of evaluation of linearity of adjustment of the degree of restoration using a test image illustrated in FIG. 9A. The results reveal that linearity illustrated in FIG. 8 is accurately reproduced.

Such linearity of adjustment of the degree of restoration is advantageous in that, when a user makes a change, a set value and a result of restoration can be easily matched, like reduction in the number of adjustment parameters. For example, a scroll bar corresponding to the restoration strength adjustment factor μ can be displayed on the display portion 105. The scroll bar can be operated by a user through the operating portion 111 or directly by a user on the screen, thus enabling the user to easily set a desired degree of restoration of the image.

Adjustment of the degree of restoration using the restoration strength adjustment factor μ can reduce noise and ringing. Evaluation of the image quality of an output image varies according to the purpose. Also for typical ordinary photographing, a desired image quality of an output image varies by a user or object, for example, from a soft image having a flare caused by remaining aberration to a sharp image in which aberration is removed. For example, in the case of a portrait, noise and ringing are highly annoying. In contrast, to read a numeric character from a license plate of a car by a surveillance camera or other devices, even if noise or ringing is present, it is the most important to identify the numeric character. If an unwanted effect, such as noise, ringing, or chromatic blurring, significantly appears in an image for some reason, the ability to output at least a captured image (input image) itself as an output image is important as security of an output image. These various requests can be met by adjustment of the restoration strength adjustment factor μ.

Even when the restoration strength adjustment factor μ is used, simply re-setting μ, which is an adjustment parameter, is required to change the degree of restoration as in the first embodiment. Therefore, because it is not necessary to recalculate a filter, a desired image is obtainable by a further small amount of calculation.

The embodiments of image processing in the image pickup apparatus are described above. However, the image pickup apparatus can be variously modified or changed without departing from the scope thereof.

The above-described image processing is also applicable to an image generation apparatus that has no image pickup optical system. For example, in the case of a scanner (reading apparatus) for capturing an image while an image pickup element is in close contact with an object surface or an X-ray machine, it has no image pickup optical system, such as a lens, but an output image is considerably degraded by image sampling carried out by the image pickup element. This degradation characteristic does not result from an image pickup optical system, but it is an image pickup system transfer function, so it corresponds to the above optical transfer function (OTF). Accordingly, even with no image pickup optical system, if an image restoration filter is generated on the basis of the transfer function, a secondary restored image described in the second embodiment can be generated.

Fourth Embodiment

Figure 10:
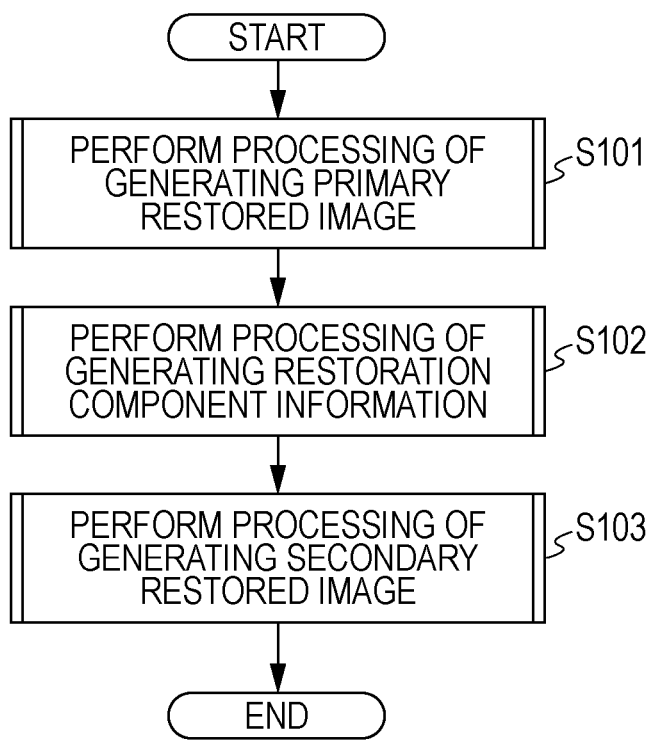
FIG. 10 illustrates a process flow according to a fourth embodiment.

In the first to third embodiments, processing of the image processing portion 104 in the image pickup apparatus is described. An example in which this processing is executed by a program is described here. FIG. 10 is a process flow of the program, and the processing is performed by a central processing unit (CPU) executing the program.

First, in step S101, processing of generating a primary restored image using an OTF or a transfer function of the system is performed on an input image to generate a primary restored image. Next, in step S102, restoration component information is obtained from the difference between the input image and the primary restored image. Next, in step S103, the restoration component information for each color component is applied to the input image on the basis of an adjustment parameter (color combination ratio adjustment factor ω, restoration strength adjustment factor μ), thereby obtaining a secondary restored image. The above processing enables a good-quality image in which chromatic blurring is adjusted to be obtainable.

Figure 11A:
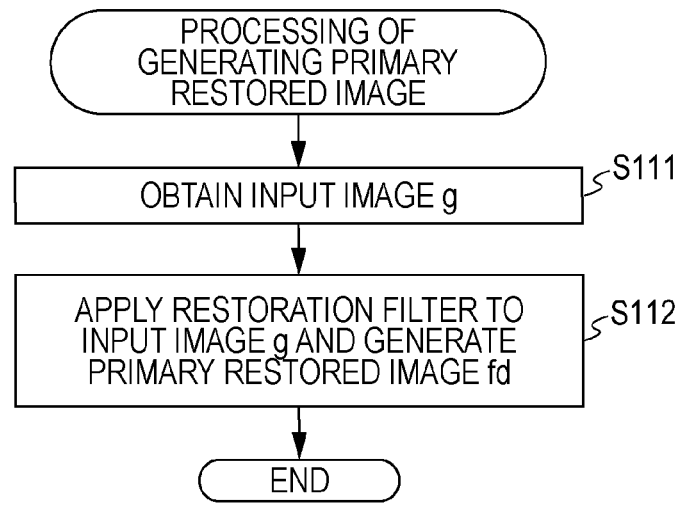
FIGS. 11A to 11C illustrate process flows occurring when the color combination ratio adjustment factor $\omega$ is used.
Figure 11B:
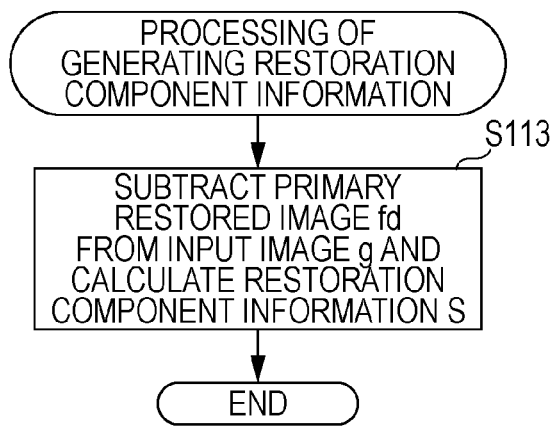
Figure 11C:
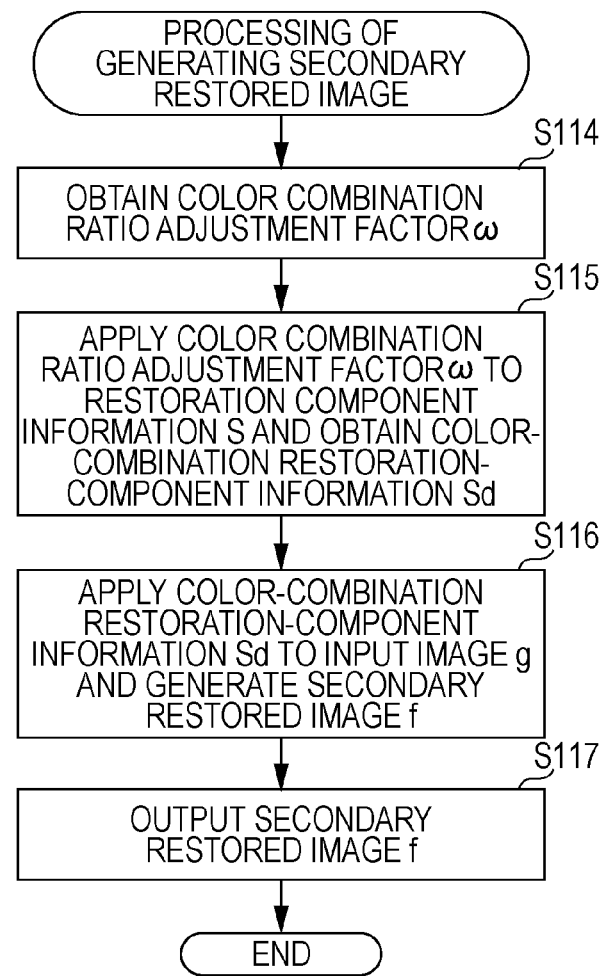

The above-described steps S101 to S103 are described in detail using the flowcharts of FIGS. 11A to 11C.

First, in the processing of generating a primary restored image of step S101 illustrated in FIG. 10, as illustrated in FIG. 11A, an input image is obtained in step S111. Next, in step S112, convolution of an image restoration filter generated based on an OTF or a transfer function of the system is applied to the input image obtained in S111, and a primary restored image is thus generated. Next, as illustrated in FIG. 11B, in the step of the processing of generating restoration component information in step S102 illustrated in FIG. 10, in step S113, restoration component information is generated by subtraction of the primary restored image from the input image, and flow proceeds to the processing of generating secondary restored image. In step S114 illustrated in FIG. 11C of the processing of generating a secondary restored image in step S103 illustrated in FIG. 10, a color combination ratio adjustment factor described in the first embodiment is obtained. Next, in step S115, the color combination ratio adjustment factor is applied to the restoration component information obtained in step S113, and color-combination restoration-component information is thus generated. Next, in step S116, the color-combination restoration-component information is applied to the input image, and a secondary restored image is thus generated. Then, in step S117, the secondary restored image is output.

This series of processing can adjust a combination ratio among color components. Accordingly, a good-quality image is obtainable.

Another advantage is the unnecessity of recalculation of an image restoration filter in changing the degree of restoration of a secondary restored image. Therefore, a load of image processing can be further reduced, and the processing can be faster.

Next, a process flow of executing image restoration processing employing both the color combination ratio adjustment factor ω and the restoration strength adjustment factor μ by a program is described using FIG. 12. As for primary image restoration processing and processing of obtaining restoration component information are the same as the process flows illustrated in FIGS. 11A and 11B, and the description thereof is omitted here. Only processing of generating a secondary restored image is described.

In step S121, a color combination ratio adjustment factor is obtained. In step S122, the color combination ratio adjustment factor is applied to the restoration component information generated in the step of generating restoration component information (in FIG. 11B), thus generating color-combination restoration-component information. Next, in step S123, a restoration strength adjustment factor is obtained. In step S124, the color-combination restoration-component information is multiplied by the restoration strength adjustment factor, thus generating a secondary restored image. Next, in step S125, the secondary restored image is output. In the present embodiment, after the color combination ratio adjustment factor is obtained, the restoration strength adjustment factor is obtained. However, they may be obtained in advance, or alternatively, a value changed by a user may be obtained where appropriate, as described in the second embodiment. With FIG. 12, the flow occurring when both the color combination ratio adjustment factor ω and the restoration strength adjustment factor μ are used is described. However, the processing may also be performed using only the restoration strength adjustment factor μ.

Fifth Embodiment

Figure 13A:
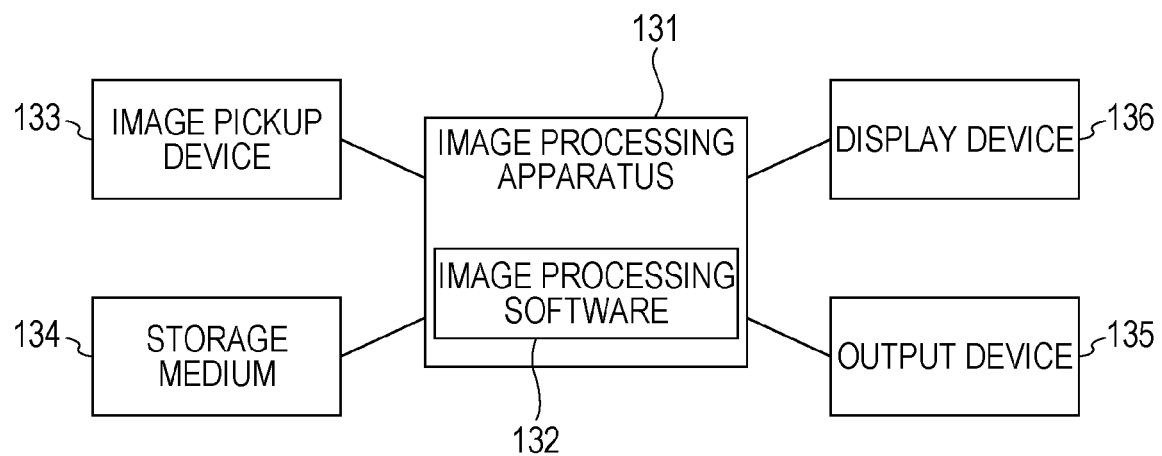
FIGS. 13A and 13B are block diagrams of an image processing system according to a fifth embodiment.

A fifth embodiment describes an example in which the image processing described in the first to fourth embodiments is applied to a system. FIG. 13A illustrates an example of a basic configuration when the image processing according to the present invention is applied to an image processing system. An image processing apparatus 131 illustrated in FIG. 13A is a computer device incorporating image processing software 132. The image processing apparatus 131 is connectable to devices described below. An image pickup device 133 is an image pickup device, such as a camera, a microscope, or a scanner. A storage medium 134 is a device that can store a captured image, and examples of the storage medium 134 include a semiconductor memory, a hard disk, and a server on a network. The image processing apparatus 131 obtains capture image data from the image pickup device 133 or the storage medium 134 and outputs the image data subjected to specific image processing to one or more of an output device 135, the image pickup device 133, and the storage medium 134. The image data can also be output to and retained in a storage portion incorporated in the image processing apparatus 131. One example of the output device 135 can be a printer. The image processing apparatus 131 is connected to a display device 136 being a monitor. A user can perform an image processing task and evaluate a corrected image through the display device 136. The image processing software 132 has the function of adjusting the degree of restoration of an image and, if needed, the function of development and other image processing functions. In the following, the degree of restoration includes adjustment of the degree of chromatic blurring described in the first to fourth embodiments.

Figure 13B:
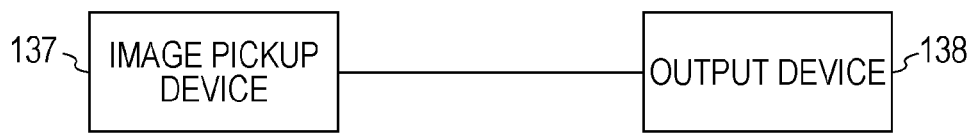

Another image processing system is described using FIG. 13B. As in the first embodiment, when a series of image processing is performed by an image pickup device 137 alone, the image pickup device 137 can output a secondary restored image directly to an output device 138. When the output device 138 incorporates an image processing apparatus, the degree of restoration can be adjusted at the output device 138. This is advantageous in that adjusting the degree of restoration in response to image degradation characteristics in outputting by the output device 138 enables an image with a higher image quality to be provided.

Figure 14:
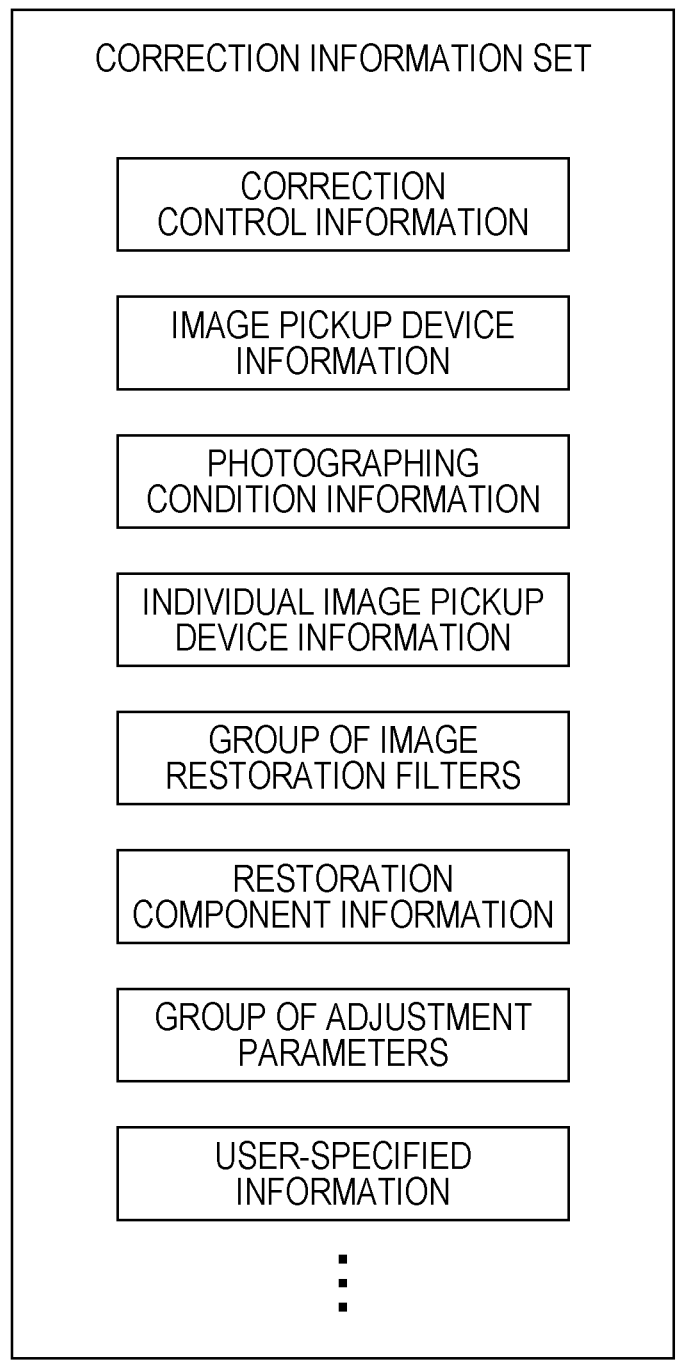
FIG. 14 illustrates data exchangeable between systems according to the fourth embodiment.

Here, contents of correction data transmitted between devices for performing image processing containing image restoration processing and exchange of the correction data are described. FIG. 14 illustrates contents of correction data. A set of correction information contains information about correction described below.

Correction Control Information

Correction control information is setting information about which device among the image pickup device 133, the image processing apparatus 131, and the output device 135 is to perform primary image restoration processing and processing of adjusting the degree of restoration and selection information on data to be transmitted to another device together with this. For example, when the image pickup device 133 performs only primary image restoration processing and the image processing apparatus 131 adjusts the degree of restoration, it is not necessary to transmit an image restoration filter, but it is necessary to transmit at least a captured image and restoration component information.

Image Pickup Device Information

Image pickup device information is information for identifying the image pickup device 133 corresponding to a production name. When a lens and a camera main body are interchangeable, the image pickup device information is identifying information that contains information about their combinations.

Photographing Condition Information

Photographing condition information is information regarding the condition of an image pickup device in image capture. Examples thereof include a focal length, a stop value, an image capture distance, ISO speed ratings, white balance, and shooting mode.

Individual Image Pickup Device Information

Individual image pickup device information is information for identifying individual image pickup devices, in contrast to the above image pickup device information. Variations caused by manufacturing errors result in variations in optical transfer functions (OTFs) of image pickup devices. Therefore, the individual image pickup device information is effective at setting an adjustment parameter appropriate for each individual device. The individual image pickup device information may also be a correction value for use in individually changing an adjustment parameter.

Group of Image Restoration Filters

A group of image restoration filters is a set of image restoration filters for use in processing of generating a primary restored image. If a device configured to perform the processing of generating a primary restored image has no image restoration filter, it is necessary to receive an image restoration filter from another device.

Restoration Component Information

If image restoration processing (primary image restoration processing, processing of generating restoration component information) has already been performed and restoration component information has been generated, transmitting the captured image and the restoration component information enables another device to perform processing of adjusting the degree of restoration.

Group of Adjustment Parameters

A group of adjustment parameters is a set of the color combination ratio adjustment factor ω and the restoration strength adjustment factor μ. As previously described, the color combination ratio adjustment factor ω and the restoration strength adjustment factor μ can be changed according to the position of an image and can also be changed in response to the condition of image capture. Examples of data of the group of adjustment parameters can include table data of the adjustment factor itself and a function for determining the adjustment factor.

User-Specified Information

User-specified information is used for adjusting the degree of restoration to suit the user's needs and can be an adjustment parameter or a correction function for an adjustment parameter. The user can set and change the adjustment parameter. The use of the user-specified information enables a desired output image to be always obtainable as an initial value. For the user-specified information, the most preferable sharpness may be updated by learning function on the basis of a history of determining an adjustment parameter by a user. In addition, preset values corresponding to several sharpness patterns can also be supplied by a provider (manufacturer) of image pickup devices over a network.

The above-described correction information set may preferably be attached to individual image data. Attaching necessary correction information to image data enables a device that incorporates an image processing apparatus to perform processing of adjusting the degree of restoration. The contents of the correction information set can be automatically and manually selected when necessary. For example, when another device performs the processing of adjusting the degree of restoration, if the correction information set contains restoration component information, basically, the group of image restoration filters is not necessary.

Various kinds of information, such as information indicating image capture conditions, including a focal length of a lens, a stop, and an image capture distance, and correction information for use in correcting the image can be attached to an input image. When a series of processing from an image pickup to an output is performed by a single closed image pickup apparatus, even if information indicating image capture conditions and correction information are not attached to the image, it is obtainable in the apparatus. However, when a RAW image is obtained from an image pickup apparatus and correction processing and development processing are performed by another image processing apparatus, information indicating image capture conditions and correction information may preferably be attached to the image, as described above. However, with a system in which correction information is previously stored in the image processing apparatus and a correction factor can be selected from information indicating image capture conditions, it is not necessarily required to attach correction information to the image. The correction information used here can be the color combination ratio adjustment factor ω, for example. The correction information can have a preset value as an initial value, and the value can be changed by as user. When a monitor or an image processing apparatus incorporated in an image pickup apparatus is another device, a user can change correction information while evaluating an output image using a monitor equipped as part of an image processing system, thereby obtaining a desired output image.

In the foregoing, the embodiment about an image processing system using an image processing apparatus, an image processing program, or an image processing method according to the present invention is illustrated. However, the image processing system according to the present invention can be variously modified and changed within the scope thereof.

(First Modification)

In a first modification, a modification corresponding to a case where color interpolation processing (demosaicing processing) is performed is described. As described with FIG. 2, in combining colors for restoration component information Sm of color components, it is necessary for each pixel to have a plurality of pieces of color component information. Accordingly, in order to perform processing of generating a secondary restored image on a mosaic image having one piece of color component information for each pixel, it is necessary to perform color interpolation processing (demosaicing processing) before the color combining processing. Therefore, restoration component information Sm having a plurality of pieces of color component information for each pixel can be generated by color interpolation processing performed on restoration component information Sm for each color component or color interpolation processing performed on each of the input image $g_m$ and the primary restored image fdm.

FIG. 15A illustrates a process flow occurring when restoration component information is generated from an image subjected to color interpolation processing (demosaicing processing). The description of the previously described steps illustrated in FIG. 15 is omitted. Mosaic data and demosaic data indicate data that does not have RGB components for each pixel and data having RGB components for each pixel, respectively. Mosaic data processing and demosaic data processing indicate a status of data being a target of the processing. In the flow illustrated in FIG. 15A, before generation of color-combination restoration-component information for color combination of color components, color interpolation processing is performed; after the color combination, mask processing corresponding to color arrangement of mosaic data is performed, and the color-combination restoration-component information is returned to mosaic data. Then, the data is combined with the input image, a secondary restored image is thus generated, and color interpolation processing is performed again. In such a way, performing image restoration processing on a RAW image (mosaic image) that is not subjected to nonlinear processing enables high-precision restoration processing. Returning color-combination restoration-component information to mosaic data and performing color interpolation processing on a secondary restored image enables the color interpolation processing to be nonlinear and support the state of a signal value of the image.

It may be preferable that color interpolation processing be performed at a stage close to a final image, as in FIG. 15A, in terms of nonlinear processing. However, the color interpolation processing (demosaicing processing) is not limited to the process flow illustrated in FIG. 15A. For example, color interpolation processing may be first performed on an input image, and a demosaic image may be used in subsequent processing. As illustrated in the flow of FIG. 15B, instead of returning color-combination restoration-component information to mosaic data, an input image may be subjected to color interpolation processing to become demosaic data, and then, a secondary restored image may be generated.

(Second Modification)

Next, a relationship between white balance and adjustment of the degree of restoration is described using FIGS. 16A and 16B. White balance is a method of adjusting color tone in a digital camera and is employed in showing an appropriate color or an intended color by a photographer. A mixture ratio of RGB signals of a RAW image used in generating white is a white balance factor.

As described above, in order to generate color-combination restoration-component information, restoration component information for color components is combined according to the color combination ratio adjustment factor ω. At this time, if white balance is not considered, an intended mixture ratio is not obtainable by the setting of ω. For example, if ω is 1/3, the R, G, and B restoration components are uniformly averaged, and obtained color-combination restoration-component information has no color. However, unless the white balance factor is 1:1:1, color-combination restoration-component information of a mixture of 1/3 components has color. That is, the degree of the occurrence of chromatic blurring cannot be zero. To address this, as illustrated in FIG. 16A, white balance processing is performed on an input image. This white balance processing is processing corresponding to division of a signal value for each color component by the white balance factor and thus normalizing the level of the signal value. The normalization enables color-combination restoration-component information to be generated with a mixture ratio corresponding to the color combination ratio adjustment factor ω. Inverse white balance processing performed before generation of a secondary restored image returns white balance to the original state. This inverse white balance processing is processing corresponding to multiplying a signal value for each color component by the white balance factor and thus returning the normalized level of the signal value to the original. Another method of this white balance processing is correction of the adjustment parameter for the degree of restoration according to the white balance factor, as illustrated in FIG. 16B, not considering white balance of the image. Examples of the adjustment parameter include the color combination ratio adjustment factor ω and the restoration strength adjustment factor μ.

As described above, considering white balance in image restoration processing (primary image restoration processing, secondary image restoration processing) enables image restoration processing that reduces unnatural chromatic blurring.

(Third Modification)

Figure 17:
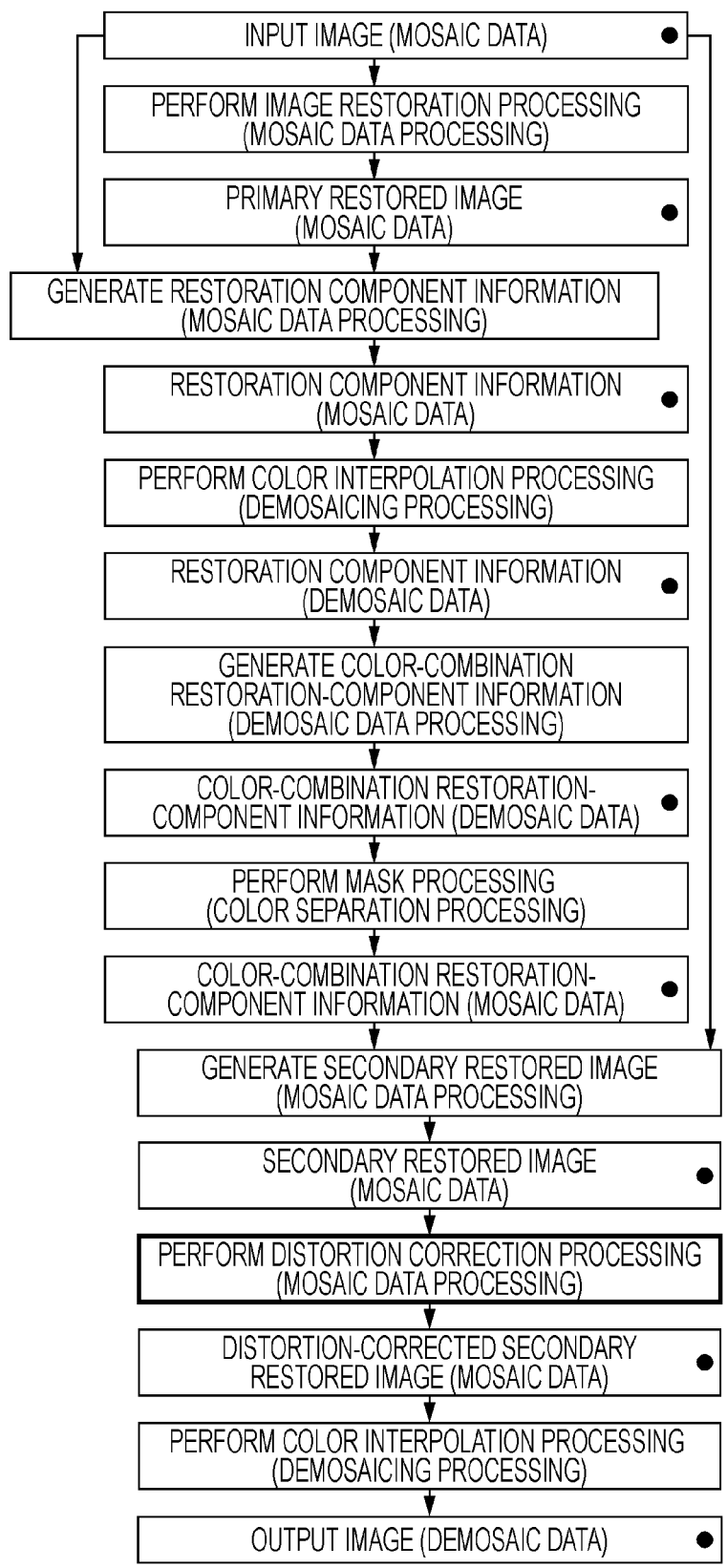
FIG. 17 is a process flow in the case where distortion correction processing is performed.

Next, a relationship between distortion correction and the degree of restoration is described using FIG. 17. This method corresponds to a case where image restoration processing is performed on a mosaic image. This enables a higher-quality image in which the occurrence of chromatic blurring and distortion is corrected to be obtained. In another process flow for performing distortion correction processing, distortion correction processing may be performed on a demosaic image in which a secondary restored image is subjected to demosaicing. In the process flow illustrated in FIG. 17, distortion aberration correction is performed after image restoration processing (primary image restoration processing).

Distortion correction can also be performed before image restoration processing (primary image restoration processing). In this case, in the image restoration processing, an image is expanded or contracted, the shape of the image may be modified, and interpolation between pixels may be performed. At this time, it is necessary for an image restoration filter to be expanded or contracted, change its shape, and perform tap interpolation. For example, for correction of barrel distortion aberration, because the outer areas of the image are largely expanded, the image restoration filter is enlarged. In addition, because of the interpolation, the accuracy of restoration is degraded. Accordingly, distortion correction may preferably be performed after image restoration processing.

(Fourth Modification)

In a fourth modification, a process flow occurring when processing of correcting lateral chromatic aberration is performed is described.

Figure 18A:
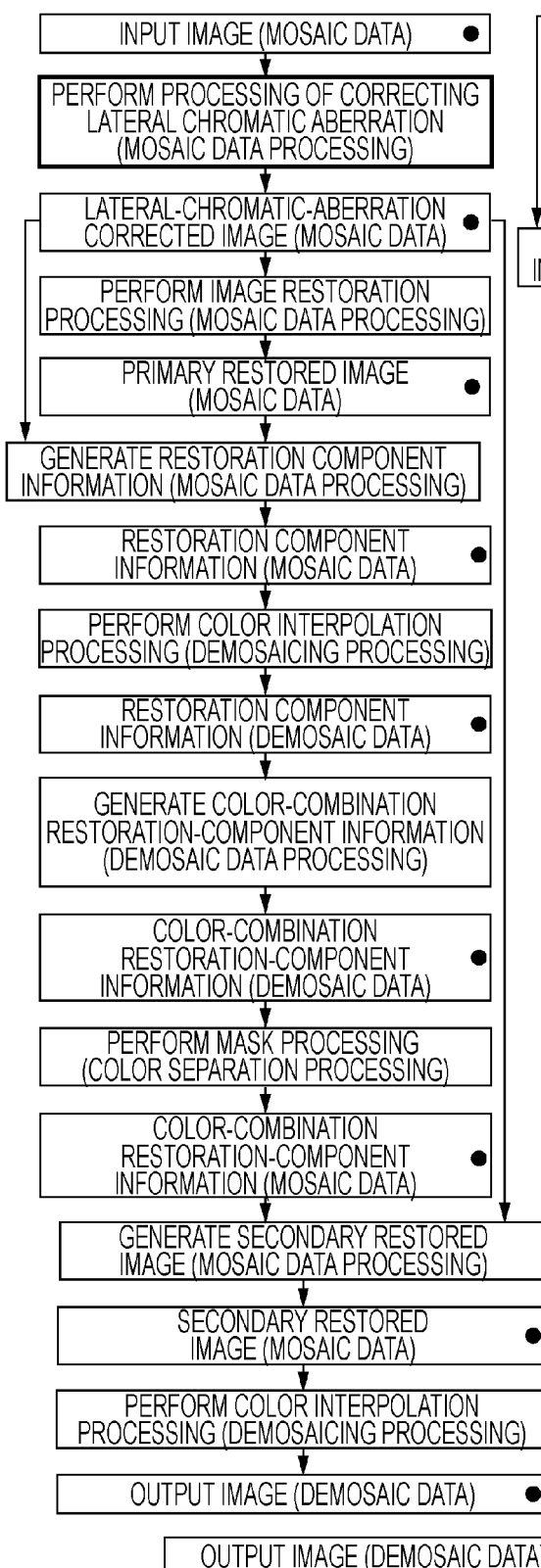
FIGS. 18A and 18B illustrate process flows in the case where lateral chromatic aberration correction processing is performed.
Figure 18B:
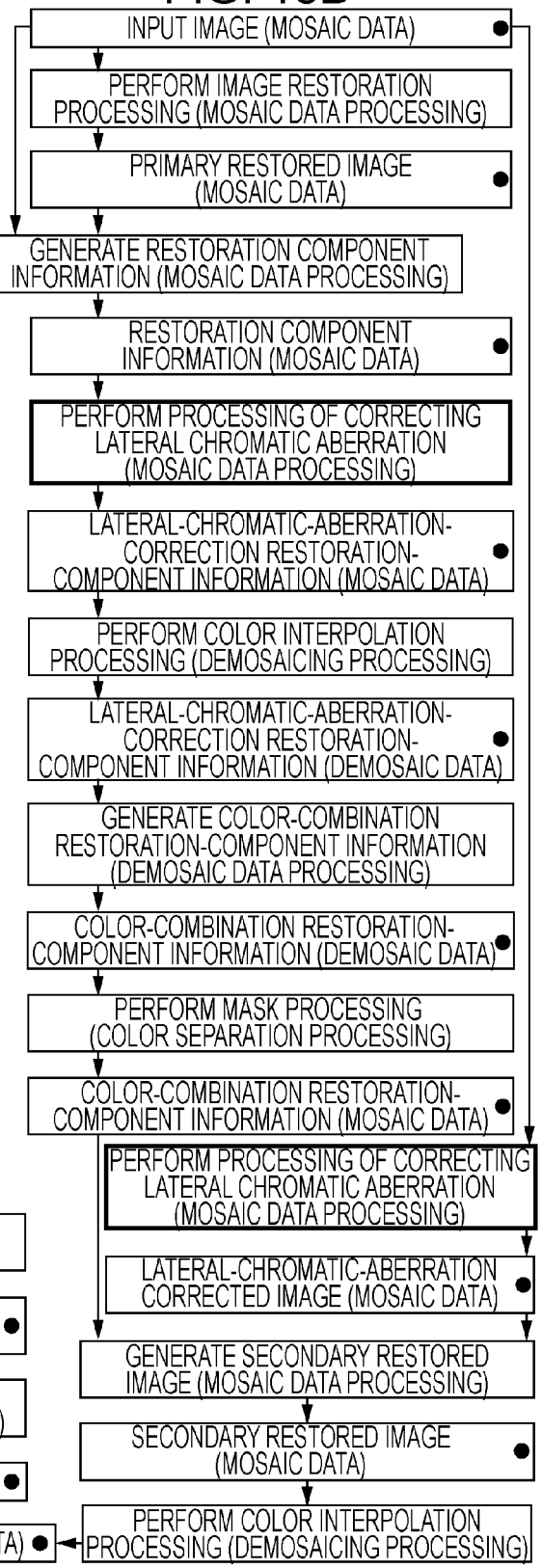

Flows that contain processing of correcting lateral chromatic aberration are illustrated in FIGS. 18A and 18B. The method illustrated in FIG. 18A first performs processing of correcting lateral chromatic aberration on an input image and, in image restoration processing, uses an image restoration filter. Another process flow is illustrated in FIG. 18B. In the process flow illustrated in FIG. 18B, processing of correcting lateral chromatic aberration is performed on restoration component information. In this case, because it is necessary to perform processing of correcting lateral chromatic aberration on an input image in order to generate a secondary restored image, the method illustrated in FIG. 18A may be preferable.

The distortion aberration correction and lateral chromatic aberration correction need interpolation between pixels together with a change in magnification of an image. If the interpolation between pixels is performed, periodical sharpness degradation corresponding to each amount of correction occurs. The period of the sharpness degradation and the amount of the degradation can be identified in advance from correction characteristics. Therefore, adjustment of the degree of restoration in response to the sharpness degradation characteristics enables the sharpness degradation to be corrected. Specifically, the restoration strength adjustment factor μ is changed in response to the amount of the degradation corresponding to the position of the image, thereby reducing unevenness of the sharpness of the output image.

A preferable example of a case where lateral chromatic aberration correction is performed together with a series of image processing is described below.

In the process flow illustrated in FIGS. 18A and 18B, the lateral chromatic aberration correction employs an image restoration filter that does not have a lateral chromatic aberration correction component. The image restoration filter can contain a correction component for lateral chromatic aberration. However, the lateral chromatic aberration correction may preferably be performed as a step different from image restoration processing. Reasons for this are described using FIGS. 19 and 20.

Figure 19:
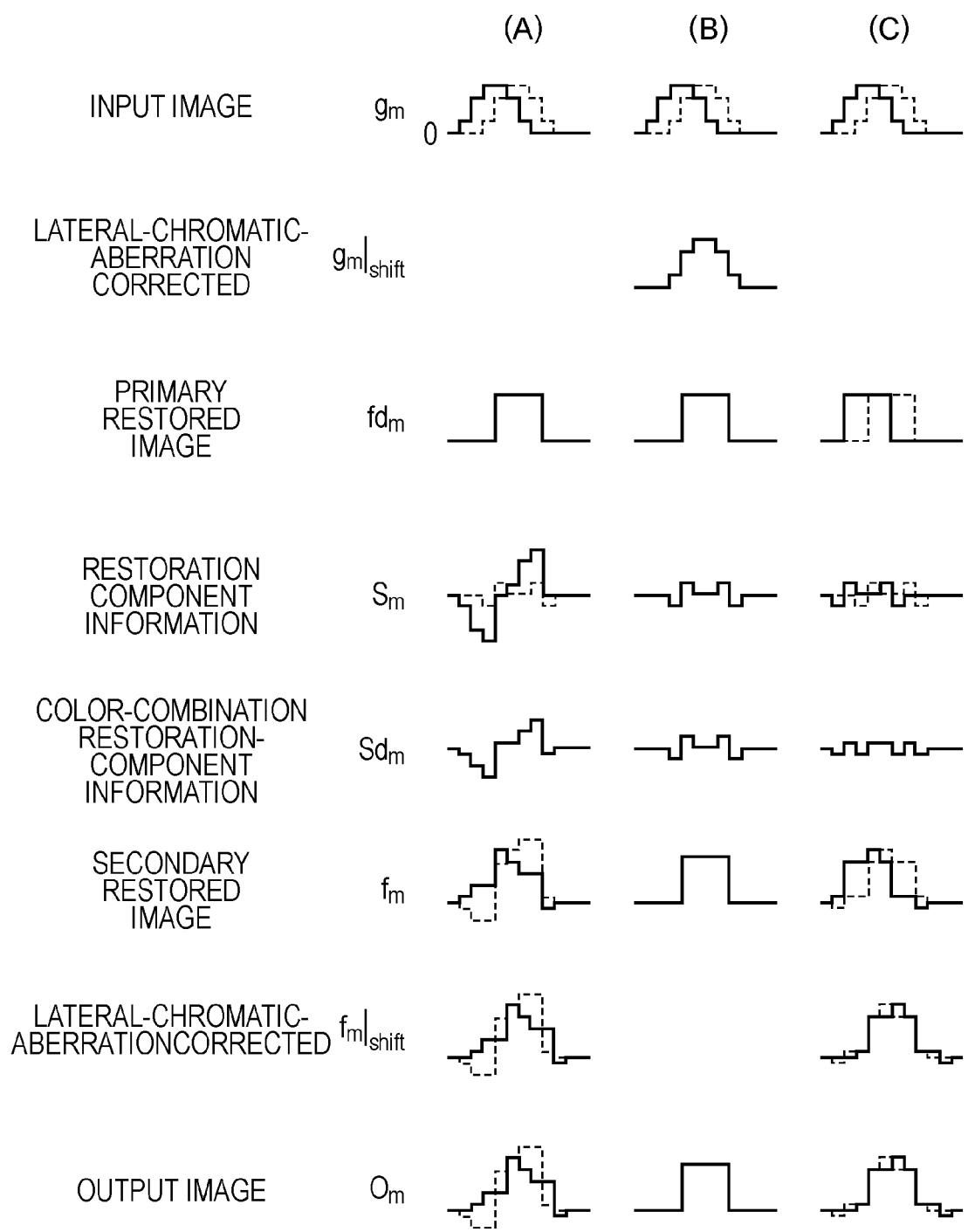
FIG. 19 illustrates diagrams for describing lateral chromatic aberration correction ($\omega=1/2$, $\mu=1$).

FIG. 19 illustrates a case where the color combination ratio adjustment factor ω is 1/2 and the restoration strength adjustment factor μ is 1. In the foregoing, three components of R, G, and B are described as the color components. Here, for the sake of simplification, two components are described. The condition that ω is 1/2 is the condition that the degree of the occurrence of chromatic blurring is zero for two color components. In FIG. 19, $g_m$ schematically illustrates a certain section of a degraded input image. The thick solid lines indicate a first color component, and the broken lines indicate a second color component. (A) of FIG. 19 illustrates a case where an image restoration filter that contains a lateral chromatic aberration correction component is used and lateral chromatic aberration correction is performed at a subsequent stage on the secondary restored image $f_m$. (B) of FIG. 19 illustrates a case where, after lateral chromatic aberration correction is performed on the input image $g_m$, an image restoration filter that does not contain a lateral chromatic aberration correction component is used. (C) of FIG. 19 illustrates a case where, after the secondary restored image $f_m$ is generated using an image restoration filter that does not have lateral chromatic aberration correction component, the lateral chromatic aberration correction is performed on that secondary restored image. $g_m$|shift is an image subjected to lateral chromatic aberration correction in only (B) of FIG. 19. $fd_m$ is a primary restored image in which image restoration processing is performed on each $g_m$|shift. It is revealed that, in all of (A), (B), and (C) of FIG. 19, blurring of the image (portion where the sharpness is reduced) is corrected. Next, in (A) and (C) of FIG. 19, the restoration component information $S_m$ is generated by subtraction of gm from $fd_m$. In (B) of FIG. 19, it is generated by subtraction $g_m$|shift from $fd_m$. $Sd_m$ is color-combination restoration-component information in which the restoration component information $S_m$ for the first color component and that for the second color component are averaged. $f_m$ is a secondary restored image in which the color-combination restoration-component information $Sd_m$ and the input image $g_m$ are combined. $f_m$|shift is an image in which lateral chromatic aberration correction is performed on the secondary restored image $f_m$. After generation of the secondary restored image, lateral chromatic aberration is corrected in (C) of FIG. 19, where the lateral chromatic aberration is not corrected, and in (A) of FIG. 19, where color misregistration is present although the image restoration filter contains the lateral chromatic aberration correction component. $O_m$ is an output image subjected to the above-described image processing. When, in the step of generating the color-combination restoration-component information $Sd_m$ from the output image $O_m$, lateral chromatic aberration remains in the restoration component information $S_m$, because the color-combination restoration-component information $Sd_m$ has an expanse containing the lateral chromatic aberration, the accuracy of correction for each color component is reduced. Accordingly, it is found that the sharpest output image $O_m$ is obtainable for a case where lateral chromatic aberration correction is performed at a stage occurring before the color-combination restoration-component information $Sd_m$ is generated, as illustrated in (B) of FIG. 19.

Figure 20:
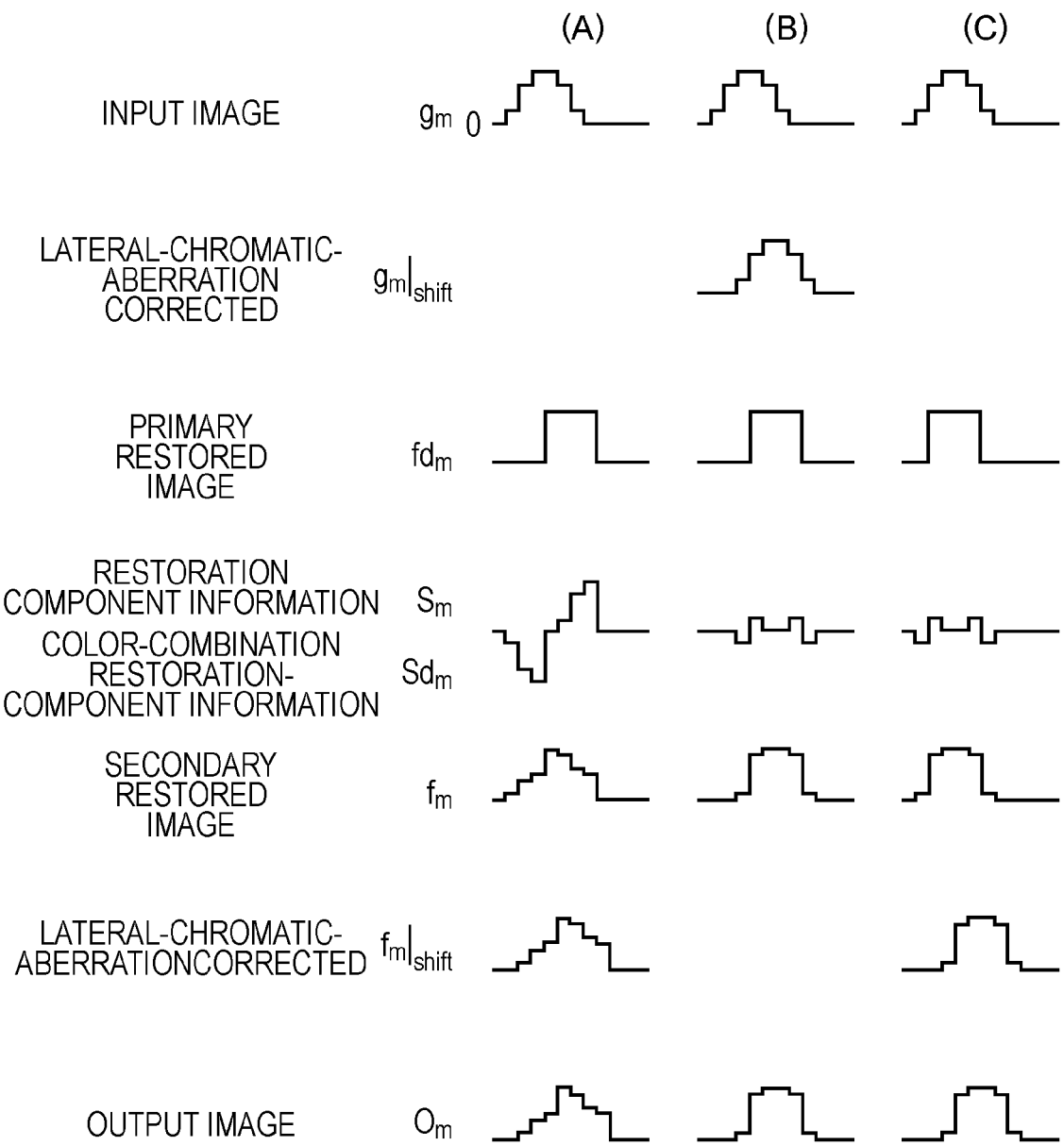
FIG. 20 illustrates diagrams for describing lateral chromatic aberration correction ($\omega=1/2$, $\mu=1/2$).

Next, FIG. 20 illustrates image restoration processing occurring when the restoration strength adjustment factor $\mu$ is set at 1/2 for a single color component. Here, because the number of color components is one, a problem arising when the above-described color-combination restoration-component information is generated is avoided. However, it is revealed that when an image restoration filter illustrated in (A) of FIG. 20 contains a lateral chromatic aberration correction component, a good-quality image is not obtainable. This is because the restoration component information contains the lateral chromatic aberration correction, and thus if the degree of restoration (restoration strength adjustment factor $\mu$) is reduced, the degree of correction of lateral chromatic aberration is reduced correspondingly.

The lateral chromatic aberration correction can be carried out by geometric transformation of coordinates and is less likely to have artifacts (e.g., ringing), like those in image restoration processing. Because of this, in adjustment of the degree of restoration, it may be preferable that correction of blurring (correction for improving the sharpness) and correction of color misregistration (lateral chromatic aberration correction) be separated, a color misregistration component be removed by the lateral chromatic aberration correction, and the degree of blurring be adjusted as the degree of restoration. Accordingly, it may be preferable that the image restoration filter contain no lateral chromatic aberration correction component and lateral chromatic aberration correction be performed in a step before image restoration processing.

In the first to fourth modifications above, preferable order of processing steps and processing that should be considered are described. If limitations are placed on the order of processing steps from another point of view, the order may be determined depending on a constraint for processing or a required image quality. It is, of course, noted that the order of processing steps may be changed within the scope where the aim of obtaining a good-quality image can be achieved.

The present invention performs image processing based on the difference between the amounts of blurring for color components. Therefore, unnatural chromatic blurring that can occur in image restoration processing can be reduced, and good image quality is obtainable.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a computer-readable storage medium. The computer-readable storage medium including, for example, any of a hard disk, a compact disc (CD), a digital versatile disc (DVD), a read only memory (ROM), a storage of distributed computing systems and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of International Application No. PCT/JP2009/071066, filed Dec. 17, 2009, which is hereby incorporated by reference herein in its entirety.

The invention claimed is:

1. An image processing apparatus comprising:
  a primary restored image generating module configured to generate a primary restored image by performing image restoration processing on an input image having a plurality of color components;
  a restoration component generating module configured to generate difference information for each of the plurality of color components by calculating a difference between the input image and the primary restored image; and
  a secondary restored image generating module configured to generate a secondary restored image using the difference information,
  wherein the secondary restored image generating module combines a color-combination restoration component based on the difference information for the plurality of color components with one color component of the input image.

2. The image processing apparatus according to claim 1, wherein the secondary restored image generating module generates the secondary restored image by combining the difference information according to a plurality of color combination ratio adjustment factors that specify a combination ratio for each of the color components.

3. The image processing apparatus according to claim 2, further comprising a setting module configured to set the color combination ratio adjustment factors,
wherein a set value set by the setting module is variable.

4. The image processing apparatus according to claim 2, wherein a plurality of values of the color combination ratio adjustment factors is set by a single set value.

5. The image processing apparatus according to claim 1, wherein the secondary restored image generating module generates the secondary restored image by combining the difference information with the input image according to a restoration strength adjustment factor that specifies a strength of restoration.

6. The image processing apparatus according to claim 5, further comprising a setting module configured to set the restoration strength adjustment factor,
wherein a set value set by the setting module is variable.

7. The image processing apparatus according to claim 1, wherein the secondary restored image generated by the secondary restored image generating module is the input image.

8. The image processing apparatus according to claim 1, wherein the primary restored image generating module obtains the primary restored image by convolving a two-dimensional image restoration filter into the input image, the two-dimensional image restoration filter being obtained by inverse Fourier transform of an optical transfer function of an image pickup optical system for each pixel of the input image.

9. The image processing apparatus according to claim 1, wherein color interpolation processing for causing each pixel to have information for the plurality of color components is performed.

10. An image processing system comprising:
an image processing apparatus comprising:
a primary restored image generating module configured to generate a primary restored image by performing image restoration processing on an input image having a plurality of color components;
a restoration component generating module configured to generate difference information for each of the plurality of color components by calculating a difference between the input image and the primary restored image; and
a secondary restored image generating module configured to generate a secondary restored image using the difference information,
wherein the secondary restored image generating module combines a color-combination restoration component based on the difference information for the plurality of color components with one color component of the input image; and
at least one of an image pickup device, an output device, a display device, and a storage medium that are connectable to the image processing apparatus.

11. An image pickup apparatus comprising:
an image pickup element that picks up an image of an object;
an image pickup optical system that guides light from the object to the image pickup element;
an image processor that performs image processing on the image picked up by the image pickup element; and
a unit storage that stores an image restoration filter for use in the image processing,
the image processor including:
a primary restored image generating module configured to generate a primary restored image by performing image restoration processing on an input image having a plurality of color components;
a restoration component generating module configured to generate difference information for each of the plurality of color components by calculating a difference between the input image and the primary restored image; and
a secondary restored image generating module configured to generate a secondary restored image using the difference information,
wherein the secondary restored image generating module combines a color-combination restoration component based on the difference information for the plurality of color components with one color component of the input image.

12. The image pickup apparatus according to claim 11, further comprising a selecting module configured to select the image restoration filter.

13. The image pickup apparatus according to claim 11, further comprising an image restoration filter generating module configured to generate the image restoration filter.

14. An image processing method comprising:
a primary restored image generating step of generating a primary restored image by performing restoration processing for each color component on an input image having a plurality of color components;
a restoration component generating step of obtaining difference information indicating a difference between the input image and the primary restored image for each color component; and
a secondary restored image generating step of generating a secondary restored image by combining a color-combination restoration component based on the difference information for the plurality of color components generated in the restoration component generating step with one color component of the input image.

15. A computer-readable non-transitory medium having stored thereon a program for causing an information processing apparatus to perform image processing on an input image, the program comprising:
a primary image restoration processing step of obtaining a primary restored image by performing restoration processing using a transfer function on the input image;
a restoration component generating step of generating difference information indicating a difference between the input image and the primary restored image; and
a secondary restored image generating step of generating a secondary restored image by combining a color-combination restoration component based on the difference information for the plurality of color components generated in the restoration component generating step with one color component of the input image.

* * * * *